US012290842B2

(12) United States Patent
Kumar et al.

(10) Patent No.: US 12,290,842 B2
(45) **Date of Patent: *May 6, 2025**

(54) SORTING OF DARK COLORED AND BLACK PLASTICS

(71) Applicants: Sortera Technologies, Inc., Markle, IN (US); Battelle Energy Alliance, LLC, Idaho Falls, ID (US)

(72) Inventors: Nalin Kumar, Fort Wayne, IN (US); Manuel Gerardo Garcia, Jr., Austin, TX (US); Isha Kamleshbhai Maun, Arlington, TX (US); Jeffrey A. Lacey, Ammon, ID (US); Lorenzo Vega Montoto, Idaho Falls, ID (US)

(73) Assignees: Sortera Technologies, Inc., Markle, IN (US); Battelle Energy Alliance, LLC, Idaho Falls, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/264,752

(22) PCT Filed: Feb. 8, 2022

(86) PCT No.: PCT/US2022/015693
§ 371 (c)(1),
(2) Date: Aug. 8, 2023

(87) PCT Pub. No.: WO2022/170273
PCT Pub. Date: Aug. 11, 2022

(65) Prior Publication Data

US 2024/0109103 A1 Apr. 4, 2024

Related U.S. Application Data

(60) Continuation-in-part of application No. 17/495,291, filed on Oct. 6, 2021, now Pat. No. 11,975,365, which
(Continued)

(51) Int. Cl.
*B07C 5/342* (2006.01)
*B07C 5/34* (2006.01)
*B07C 5/04* (2006.01)

(52) U.S. Cl.
CPC .............. *B07C 5/3422* (2013.01); *B07C 5/34* (2013.01); *B07C 5/342* (2013.01); *B07C 5/04* (2013.01); *B07C 2501/0054* (2013.01)

(58) Field of Classification Search
CPC .. B07C 5/04; B07C 5/34; B07C 5/342; B07C 5/3422; B07C 2501/0054
See application file for complete search history.

(56) References Cited

U.S. PATENT DOCUMENTS 2,194,381 A 9/1937 Cadman
2,417,878 A 2/1944 Luzietti et al.
(Continued)

FOREIGN PATENT DOCUMENTS

CA 2893877 12/2015
CN 1283319 2/2001
(Continued)

OTHER PUBLICATIONS

European Patent Office; Extended European Search Report for corresponding EP 19792330.3; Apr. 30, 2021; 7 pages; Munich, DE.
(Continued)

*Primary Examiner* — Michael McCullough
*Assistant Examiner* — Kalyanavenkateshware Kumar
(74) *Attorney, Agent, or Firm* — Kelly Kordzik

(57) ABSTRACT

Systems and methods for classifying and sorting of dark colored and/or black-colored plastic materials utilizing a vision system or one or more sensor systems implemented with one or more medium wavelength infrared cameras whereby the captured image data is process within a machine learning system in order to identify or classify each
(Continued)

of the materials, which may then be sorted into separate groups based on such an identification or classification.

16 Claims, 8 Drawing Sheets

Related U.S. Application Data is a continuation of application No. 17/380,928, filed on Jul. 20, 2021, which is a continuation-in-part of application No. 17/227,245, filed on Apr. 9, 2021, now Pat. No. 11,964,304, which is a continuation-in-part of application No. 16/939,011, filed on Jul. 26, 2020, now Pat. No. 11,471,916, which is a continuation of application No. 16/375,675, filed on Apr. 4, 2019, now Pat. No. 10,722,922, which is a continuation-in-part of application No. 15/963,755, filed on Apr. 26, 2018, now Pat. No. 10,710,119, and a continuation-in-part of application No. 15/213,129, filed on Jul. 18, 2016, now Pat. No. 10,207,296, said application No. PCT/US2022/015693 is a continuation-in-part of application No. 17/491,415, filed on Sep. 30, 2021, now Pat. No. 11,278,937, which is a continuation-in-part of application No. 16/852,514, filed on Apr. 19, 2020, now Pat. No. 11,260,426, which is a division of application No. 16/358,374, filed on Mar. 19, 2019, now Pat. No. 10,625,304, which is a continuation-in-part of application No. 15/963,755, filed on Apr. 26, 2018, now Pat. No. 10,710,119.

(60) Provisional application No. 63/146,892, filed on Feb. 8, 2021, provisional application No. 63/173,301, filed on Apr. 9, 2021, provisional application No. 62/490,219, filed on Apr. 26, 2017, provisional application No. 62/193,332, filed on Jul. 16, 2015.

(56) References Cited

U.S. PATENT DOCUMENTS 2,942,792 A 7/1957 Anderson et al.
2,953,554 A 9/1960 Miller et al.
3,512,638 A 5/1970 Chengges et al.
3,662,874 A 5/1972 Muller
3,791,518 A 2/1974 Vanderhoof
3,955,678 A 5/1976 Moyer
3,973,736 A 8/1976 Nilsson
3,974,909 A 8/1976 Johnson
4,004,681 A 1/1977 Clewett et al.
4,031,998 A 6/1977 Suzuki et al.
4,044,897 A 8/1977 Maxted
4,253,154 A 2/1981 Russ et al.
4,317,521 A 3/1982 Clark et al.
4,413,721 A 11/1983 Bollier
4,488,610 A 12/1984 Yankloski
4,572,735 A 2/1986 Poetzschke et al.
4,586,613 A 5/1986 Horii
4,726,464 A 2/1988 Canziani
4,834,870 A 5/1989 Osterberg et al.
4,848,590 A 7/1989 Kelly
5,042,947 A 8/1991 Pötzschke et al.
5,054,601 A 10/1991 Sjogren et al.
5,114,230 A 5/1992 Pryor
5,236,092 A 8/1993 Krotkov et al.
5,260,576 A 11/1993 Sommer, Jr. et al.
5,410,637 A 4/1995 Kern et al.
5,433,311 A 7/1995 Bonnet
5,462,172 A 10/1995 Kumagai et al.
5,570,773 A 11/1996 Bonnet
5,663,997 A 9/1997 Willis et al.
5,676,256 A 10/1997 Kumar et al.
5,733,592 A 3/1998 Wettstein et al.
5,738,224 A 4/1998 Sommer, Jr. et al.
5,836,436 A 11/1998 Fortenbery et al.
5,911,327 A 6/1999 Tanaka et al.
6,012,659 A 1/2000 Nakazawa et al.
6,076,653 A 6/2000 Bonnet
6,100,487 A 8/2000 Schultz et al.
6,124,560 A 9/2000 Roos
6,148,990 A 11/2000 Lapeyre et al.
6,266,390 B1 7/2001 Sommer, Jr. et al.
6,273,268 B1 8/2001 Axmann
6,313,422 B1 11/2001 Anibas
6,313,423 B1 11/2001 Sommer
6,412,642 B2 7/2002 Charles et al.
6,457,859 B1 10/2002 Lu et al.
6,519,315 B2 2/2003 Sommer, Jr. et al.
6,545,240 B2 4/2003 Kumar
6,795,179 B2 9/2004 Kumar
6,888,917 B2 5/2005 Sommer, Jr. et al.
6,983,035 B2 1/2006 Price et al.
7,073,651 B2 7/2006 Costanzo et al.
7,099,433 B2 8/2006 Sommer et al.
7,200,200 B2 4/2007 Laurila et al.
7,341,154 B2 3/2008 Boer
7,564,943 B2 7/2009 Sommer, Jr. et al.
7,616,733 B2 11/2009 Sommer et al.
7,674,994 B1 3/2010 Valerio
7,763,820 B1 7/2010 Sommer, Jr. et al.
7,802,685 B2 9/2010 Allen, III
7,848,484 B2 12/2010 Sommer, Jr. et al.
7,886,915 B2 2/2011 Shulman
7,903,789 B2 3/2011 Morton et al.
7,978,814 B2 7/2011 Sommer et al.
7,991,109 B2 8/2011 Golenhofen
8,073,099 B2 12/2011 Niu et al.
8,144,831 B2 3/2012 Sommer, Jr. et al.
8,172,069 B2 5/2012 Prakasam
8,429,103 B1 4/2013 Aradhye et al.
8,433,121 B2 4/2013 Kosarev
8,476,545 B2 7/2013 Sommer et al.
8,553,838 B2 10/2013 Sommer et al.
8,567,587 B2 10/2013 Faist et al.
8,576,988 B2 11/2013 Lewalter et al.
8,615,123 B2 12/2013 Dabic
8,654,919 B2 2/2014 Sabol et al.
8,855,809 B2 10/2014 Spencer et al.
8,903,040 B2 12/2014 Maeyama et al.
9,156,162 B2 10/2015 Suzuki et al.
9,316,596 B2 4/2016 Levesque
9,785,851 B1 10/2017 Torek et al.
9,927,354 B1 3/2018 Starr
10,036,142 B2 7/2018 Bamber
10,207,296 B2 2/2019 Garcia et al.
10,478,861 B2 11/2019 Comtois et al.
10,710,119 B2 * 7/2020 Kumar .................... G06N 3/08
10,722,922 B2 * 7/2020 Kumar ..................... B07C 5/34
10,799,915 B2 10/2020 Horowitz et al.
11,278,937 B2 3/2022 Kumar et al.
11,471,916 B2 * 10/2022 Kumar .................... B07C 5/342
2002/0141006 A1 10/2002 Pocius et al.
2003/0038064 A1 2/2003 Harbeck et al.
2003/0147494 A1 8/2003 Sommer, Jr. et al.
2003/0151746 A1 8/2003 Sperling et al.
2004/0151364 A1 8/2004 Kenneway et al.
2004/0235970 A1 11/2004 Smith et al.
2006/0239401 A1 10/2006 Sommer, Jr. et al.
2006/0256341 A1 11/2006 Kuwada
2007/0029232 A1 2/2007 Cowling
2008/0029445 A1 2/2008 Russcher et al.
2008/0041501 A1 2/2008 Platek
2008/0092922 A1 4/2008 Dick
2008/0257795 A1 10/2008 Shuttleworth
2009/0292422 A1 11/2009 Eiswerth et al.
2010/0017020 A1 1/2010 Hubbard-Nelson et al.
2010/0091272 A1 4/2010 Asada et al.
2010/0195795 A1 8/2010 Golenhofen
2010/0264070 A1 10/2010 Sommer, Jr. et al.
2010/0282646 A1 11/2010 Looy et al.

(56) References Cited

U.S. PATENT DOCUMENTS

| | | | |
|---|---|---|---|
| 2011/0083871 | A1 | 4/2011 | Lalancette et al. |
| 2011/0181873 | A1 | 7/2011 | Yavets-Chen et al. |
| 2011/0247730 | A1 | 10/2011 | Yanar |
| 2012/0148018 | A1 | 6/2012 | Sommer, Jr. et al. |
| 2012/0288058 | A1 | 11/2012 | Maeyama et al. |
| 2013/0028487 | A1 | 1/2013 | Stager et al. |
| 2013/0079918 | A1 | 3/2013 | Spencer et al. |
| 2013/0092609 | A1 | 4/2013 | Andersen |
| 2013/0126399 | A1 | 5/2013 | Wolff et al. |
| 2013/0184853 | A1 | 7/2013 | Roos |
| 2013/0229510 | A1 | 9/2013 | Killmann |
| 2013/0264249 | A1 | 10/2013 | Sommer, Jr. et al. |
| 2013/0304254 | A1 | 11/2013 | Torek et al. |
| 2015/0012226 | A1 | 1/2015 | Skaff |
| 2015/0092922 | A1 | 4/2015 | Liu et al. |
| 2015/0170024 | A1 | 6/2015 | Chatterjee et al. |
| 2015/0254532 | A1 | 9/2015 | Talathi et al. |
| 2015/0336135 | A1 | 11/2015 | Corak |
| 2016/0016201 | A1 | 1/2016 | Schons |
| 2016/0022892 | A1 | 1/2016 | Eifler et al. |
| 2016/0066860 | A1 | 3/2016 | Sternickel et al. |
| 2016/0180626 | A1 | 6/2016 | Young |
| 2016/0299091 | A1 | 10/2016 | Bamber et al. |
| 2016/0346811 | A1 | 12/2016 | Iino |
| 2017/0014868 | A1 | 1/2017 | Garcia, Jr. et al. |
| 2017/0221246 | A1 | 8/2017 | Zhong et al. |
| 2017/0232479 | A1 | 8/2017 | Pietzka et al. |
| 2017/0261437 | A1 | 9/2017 | Buchter et al. |
| 2018/0065155 | A1 | 3/2018 | Ripley |
| 2018/0243800 | A1 | 8/2018 | Kumar et al. |
| 2019/0130560 | A1 | 5/2019 | Horowitz et al. |
| 2019/0247891 | A1 | 8/2019 | Kumar et al. |
| 2019/0299255 | A1 | 10/2019 | Chaganti |
| 2020/0050922 | A1 | 2/2020 | Wu et al. |
| 2020/0084966 | A1 | 3/2020 | Corban et al. |
| 2020/0361659 | A1 | 11/2020 | Whitman et al. |
| 2020/0368786 | A1 | 11/2020 | Kumar et al. |
| 2021/0094075 | A1 | 4/2021 | Horowitz et al. |
| 2021/0217156 | A1 | 7/2021 | Balachandran et al. |
| 2021/0229133 | A1 | 7/2021 | Kumar et al. |
| 2021/0346916 | A1 | 11/2021 | Kumar et al. |

FOREIGN PATENT DOCUMENTS

| | | | |
|---|---|---|---|
| CN | 200953004 | | 9/2007 |
| CN | 201440132 | | 4/2010 |
| CN | 201464390 | | 5/2010 |
| CN | 101776620 | A | 7/2010 |
| CN | 201552461 | | 7/2010 |
| CN | 102861722 | | 1/2013 |
| CN | 103501925 | | 1/2014 |
| CN | 103745901 | | 4/2014 |
| CN | 101776620 | B | 6/2014 |
| CN | 103955707 | | 7/2014 |
| CN | 203688493 | | 7/2014 |
| CN | 204359695 | | 5/2015 |
| CN | 204470139 | | 7/2015 |
| CN | 204495749 | | 7/2015 |
| CN | 204537711 | | 8/2015 |
| CN | 204575572 | | 8/2015 |
| CN | 104969266 | | 10/2015 |
| CN | 106000904 | | 10/2016 |
| CN | 107403198 | | 11/2017 |
| CN | 107552412 | | 1/2018 |
| CN | 107790398 | | 3/2018 |
| CN | 21188005 | U | 11/2020 |
| CN | 113272649 | | 8/2021 |
| DE | 202009006383 | | 9/2009 |
| EP | 0011892 | | 11/1983 |
| EP | 0074447 | | 1/1987 |
| EP | 0433828 | A2 | 12/1990 |
| EP | 0351778 | B1 | 10/1993 |
| EP | 2243089 | A1 | 10/2010 |
| EP | 3263234 | | 1/2018 |
| JP | H07-275802 | | 10/1995 |
| JP | 2010-172799 | | 8/2010 |
| JP | 5083196 | | 11/2012 |
| JP | 2015-512075 | | 4/2015 |
| JP | 5969685 | | 7/2016 |
| JP | 2017-109197 | | 6/2017 |
| JP | 202163078 | | 10/2021 |
| KR | 20090106056 | | 10/2009 |
| RU | 2004101401 | | 2/2005 |
| RU | 2006136756 | | 4/2008 |
| RU | 2339974 | | 11/2008 |
| RU | 2361194 | | 7/2009 |
| TW | 200940989 | | 10/2009 |
| WO | WO9920048 | | 4/1999 |
| WO | WO2001/022072 | | 3/2001 |
| WO | WO2009/039284 | | 3/2009 |
| WO | WO2011/159269 | | 12/2011 |
| WO | WO2012/094568 | | 7/2012 |
| WO | WO2013/033572 | | 3/2013 |
| WO | WO2013/180922 | | 12/2013 |
| WO | WO2015/195988 | | 12/2015 |
| WO | WO2016/199074 | | 12/2016 |
| WO | WO2017/001438 | | 1/2017 |
| WO | WO2017/011835 | | 1/2017 |
| WO | WO2017/221246 | | 12/2017 |
| WO | WO2021/089602 | | 5/2021 |
| WO | WO2021/126876 | | 6/2021 |
| WO | WO2019/180438 | | 9/2022 |

OTHER PUBLICATIONS

India Patent Office; Office Action issued for corresponding India Application Serial No. 201937044046; Jun. 4, 2020; 7 pages; IN.

United States International Searching Authority; International Search Report & Written Opinion for PCT/US2016/042850; Sep. 28, 2016; 15 pages; Alexandria, VA; US.

International Alloy Designations and Chemical Composition Limits for Wrought Aluminum and Wrought Aluminum Alloys, The Aluminum Association, Inc., revised Jan. 2015, 38 pages.

International Searching Authority, International Search Report and the Written Opinion, International Application No. PCT/US2016/042850, Sep. 28, 2016.

P. R. Schwoebel et al., "Studies of a prototype linear stationary x-ray source for tomosynthesis imaging," Phys. Med Biol. 59, pp. 2393-2413, Apr. 17, 2014.

R. Sitko et al., "Quantification in X-Ray Fluorescence Spectrometry," X-Ray Spectroscopy, Dr. Shatendra K Sharma (Ed.), ISBN: 978-953-307-967-7, InTech, 2012, pp. 137-163; Available from: http://www.intechopen.com/books/x-ray-spectroscopy/quantification-in-x-ray-fluorescence-spectrometry.

Scrap Specifications Circular, Institute of Scrap Recycling Industries, Inc., effective Jan. 21, 2016, 58 pages.

The International Bureau of WIPO, International Preliminary Report on Patentability, International Application No. PCT/US2016/42850, Jan. 25, 2018.

A. Lee, "Comparing Deep Neural Networks and Traditional Vision Algorithms in Mobile Robotics," Swarthmore College, 9 pages, downloaded from Internet on May 1, 2018.

C. K. Lowe et al., "Data Mining With Different Types of X-Ray Data," JCPDS-International Centre for Diffraction Data 2006, ISSN 1097-0002, pp. 315-321.

M. Razzak et al., "Deep Learning for Medical Image Processing: Overview, Challenges and Future," 30 pages, downloaded from Internet on May 1, 2018.

J. Schmidhuber et al., "Deep Learning in Neural Networks: An Overview," The Swiss AI Lab IDSIA, Technical Report IDSIA-03-14/arXiv:1404.7828 v4 [cs.NE], Oct. 8, 2014, 88 pages.

M. Singh et al., "Transforming Sensor Data to the Image Domain for Deep Learning—an Application to Footstep Detection," International Joint Conference on Neural Networks, Anchorage, Alaska, 8 pages, May 14-19, 2017.

K. Tarbell et al., "Applying Machine Learning to the Sorting of Recyclable Containers," University of Illinois at Urbana-Champaign, Urbana, Illinois, 7 pages, downloaded from Internet on May 1, 2018.

(56) References Cited

OTHER PUBLICATIONS

Wikipedia, Convolutional neural network, 18 pages https://en.wikipedia.org/w/index.php?title=Convolutional_neural_network, downloaded from Internet on May 1, 2018.
Wikipedia, TensorFlow, 4 pages https://en.wikipedia.org/w/index.php?title=TensorFlow&oldid=835761390, downloaded from Internet on May 1, 2018.
The United States Patent and Trademark Office, Non-Final Office Action, U.S. Appl. No. 15/213,129, Oct. 6, 2017.
International Searching Authority, International Search Report and the Written Opinion, International Application No. PCT/US2018/029640, Jul. 23, 2018; 23 pages; Alexandria, VA; US.
European Patent Office; Extended Search Report for 16825313.6; Jan. 28, 2019; 12 pages; Munich, DE.
India Patent Office; Office Action issued for corresponding India Application Serial No. 201817002365; Mar. 12, 2020; 6 pages; IN.
International Searching Authority, International Search Report and the Written Opinion, International Application No. PCT/US2019/022995, Jun. 5, 2019; 10 pages; Alexandria, VA; US.
T. Miller et al., "Elemental Imaging For Pharmaceutical Tablet Formulations Analysis By Micro X-Ray Fluorescence," International Centre for Diffraction Data, 2005, Advances in X-ray Analysis, vol. 48, pp. 274-283.
T. Moriyama, "Pharmaceutical Analysis (5), Analysis of trace impurities in pharmaceutical products using polarized EDXRF spectrometer NEX CG," Rigaku Journal, vol. 29, No. 2, 2013, pp. 19-21.
U.S. Appl. No. 15/213,129, filed Jul. 18, 2016.
M. Baudelet et al., "The first years of laser-induced breakdown spectroscopy," J. Anal. At. Spectrom., Mar. 27, 2013, 6 pages.
International Searching Authority, International Search Report and The Written Opinion of the International Searching Authority, International Application No. PCT/US2016/45349, Oct. 17, 2016.
J. McComb et al., "Rapid screening of heavy metals and trace elements in environmental samples using portable X-ray fluorescence spectrometer, A comparative study," Water Air Soil Pollut., Dec. 2014, vol. 225, No. 12, pp. 1-16.
J. Mondia, "Using X-ray fluorescence to measure inorganics in biopharmaceutical raw materials," Anal. Methods, Mar. 18, 2015, vol. 7, pp. 3545-3550.
L. Goncalves, "Assessment of metal elements in final drug products by wavelength dispersive X-ray fluorescence spectrometry," Anal. Methods, May 19, 2011, vol. 3, pp. 1468-1470.
L. Hutton, "Electrochemical X-ray Fluorescence Spectroscopy for Trace Heavy Metal Analysis: Enhancing X-ray Fluorescence Detection Capabilities by Four Orders of Magnitude," Analytical Chemistry, Apr. 4, 2014, vol. 86, pp. 4566-4572.
L. Moens et al., Chapter 4, X-Ray Fluorescence, Modern Analytical Methods in Art and Archaeology, Chemical Analysis Series, vol. 155, pp. 55-79, copyright 2000.
B. Shaw, "Applicability of total reflection X-ray fluorescence (TXRF) as a screening platform for pharmaceutical inorganic impurity analysis," Journal of Pharmaceutical and Biomedical Analysis, vol. 63, 2012, pp. 151-159.
Briefing Elemental Impurities-Limits, Revision Bulletin, The United States Pharmacopeial Convention, Feb. 1, 2013, 3 pages.
Chapter 6, Functional Description, S2 Picofox User Manual, 2008, pp. 45-64.
D. Bradley, "Pharmaceutical toxicity: AAS and other techniques measure pharma heavy metal," Ezine, May 15, 2011, 2 pages.
E. Margui et al., "Determination of metal residues in active pharmaceutical ingredients according to European current legislation by using X-ray fluorescence spectrometry," J. Anal. At. Spectrom., Jun. 16, 2009, vol. 24, pp. 1253-1257.
Elemental Impurity Analysis In Regulated Pharmaceutical Laboratories, A Primer, Agilent Technologies, Jul. 3, 2012, 43 pages.
Exova, X-ray fluorescence: a new dimension to elemental analysis, downloaded from www.exova.com on Jul. 26, 2016, 3 pages.
G. O'Neil, "Direct Identification and Analysis of Heavy Metals in Solution (Hg, Cu, Pb, Zn, Ni) by Use of in Situ Electrochemical X-ray Fluorescence," Analytical Chemistry, Feb. 2015, 22 pages.
Guideline for Elemental Impurities, Q3D, International Conference on Harmonisation of Technical Requirements For Registration of Pharmaceuticals for Human Use, ICH Harmonised Guideline, Current Step 4 version, Dec. 16, 2014, 77 pages.
The United States Patent and Trademark Office, Non-Final Office Action, U.S. Appl. No. 16/375,675, Jun. 28, 2019.
The United States Patent and Trademark Office, Final Office Action, U.S. Appl. No. 16/375,675, Jan. 17, 2020.
"Alloy Data: Aluminum Die Casting Alloys," MES, Inc., 4 pages, downloaded from the internet Mar. 28, 2019, www.mesinc.com.
C.O. Augustin et al., "Removal of Magnesium from Aluminum Scrap and Aluminum-Magnesium Alloys," Bulletin of Electrochemistry 2(6), Nov.-Dec. 1986; pp. 619-620.
E.A. Vieira et al., "Use of Chlorine to Remove Magnesium from Molten Aluminum," Materials Transactions, vol. 53, No. 3, pp. 477-482, Feb. 25, 2012.
Skpecim Spectral Imaging; Hyperspectral Technology vs. RGB; at least as early as Mar. 9, 2021; 3 pages; Oulu, Finland.
Wikipedia; Digital image processing; Retrieved from https://en.wikipedia.org/w/index.php?title=Digital_image_processing&oldid=1015648152; Apr. 2, 2021; Wikimedia Foundation, Inc.; US.
Wikipedia; Machine vision; Retrieved from https://en.wikipedia.org/w/index.php?title=Machine_vision&oldid=1021673757; May 6, 2021; Wikimedia Foundation, Inc.; US.
Aclima; How artificial intelligence helps recycling become more circular; retrieved frfom https://aclima.eus/how-artificial-intelligence-helps-recycling-become-more-circular; Jan. 27, 2022; (5 pages); VE.
Guillory et al.; Analysis of Multi-layer polymer films; Apr. 2009; vol. 12; No. 4, Materials Today; 2 pages; Elseview; NL.
U.S. Department of Energy; Waste-to-Energy From Municipal Solid Wastes; Aug. 2019; 36 pages; US.
SAPP; Lehigh University scores $3.5M DOE Grant to use AI and spectroscopy to analyze waste materials; Biofuelsdigest.com; retrieved from https://www.biofuelsdigest.com/bdigest/2021/09/27/lehigh-university-scores-3-5m-doe-grant-to-use-ai-and-spectroscopy-to-analyse-waste-materials/; 1 page; Sep. 27, 2021; US.
Energy Information Administration; Methodoly for Allocating Municipal solid Waste to Biogenic and Non-Biogenic Energy; May 2007; 18 pages; US.
Fadillah et al.; Recent Progress in Low-Cost Catalysts for Pyrolysis of Plastic Waste to Fuels; 17 pages; Catalysts 2021, 11, 837; Jul. 10, 2021; mdpi.com; Basel, Switzerland.
Lukka et al; Robotic Sorting using Machine Learing; ZenRobotics Recycler; Sensor Based Sorting 2014; https://users.ics.aalto.fi > praiko > papers > SBS14; US.
Wikipedia; Plastic recycling; Retrieved from "https://en.wikipedia.org/w/index.php?title=Plastic_recycling&oldid=1067847730" Jan. 25, 2022; Wikimedia Foundation, Inc; US.
Aimplas; Classification and identification of plastics; https://www.aimplas.net/blog/plastics-identification-and-classification/; Jan. 27, 2022; 4 pages; València Parc Tecnològic; Valencia; Spain.
SPECIM; Plastics Sorting with SPECIM FX Cameras; 5 pages; Dec. 18, 2020; Oulu, FI.
Ruj et al.; Sorting of plastic waste for effective recycling; Int. Journal of Applied Sciences and Engineering Research, vol. 4, Issue 4, 2015; 8 pages; International Journal of Applied Science and Engineering Research; ijaser.com; New Delhi, IN.
Wikipedia; Spectral imaging; Retrieved from "https://en.wikipedia.org/w/index.php?title=Spectral_imaging&oldid=1066379790"; Jan. 18, 2022; Wikimedia Foundation, Inc; US.
Acplasics, Inc.; 7 Different Types of Plastic; https://www.acplasticsinc.com/informationcenter/r/7-different-types-of-plastic-and-how-they-are-used; 4 pages; Jan. 27, 2022; A&C Plastics; Houston, TX.
Rozenstein, O. et al.; Development of a new approach based on midwave infrared spectroscopy for post-consumer black plastic waste sorting in the recycling industry; Waste Management 68 (2017; pp. 38-44; abstract.

(56) References Cited

OTHER PUBLICATIONS

United States International Searching Authority; International Search Report & Written Opinion for PCT/US2022/015693; May 6, 2022; 9 pages; Alexandria, VA; US.

Daehn et al.; Preventing Wetting Between Liquid Copper and Solid Steel: A Simple Extraction Technique; Metallurgical and Materials Transactions B; vol. 50B; Aug. 2019; pp. 1637-1651; Springer; NY, NY; US.

Daehn et al.; How Will Copper Contamination Constrain Future Global Steel Recycling?; Environmental Science & Technology; Amerian Chemical Society; ACS Publictions; DOI: 10.1021/acs.est.7b00997; at least as early as May 2022; Washington; US.

Daehn et al.; Finding the Most Efficient Way to Remove Residual Copper from Steel Scrap; Metallurigical and Materials Transactions B; vol. 50B, Jun. 2019; pp. 1225-1240; Springer, NY, NY; US.

Shattuck et al.; The Case for Producing Low-Copper Steel with Ballistic Separators; May 2, 2018; https://wasteadvantagemag.com/the-case-for-producing-low-copper-steel-with-ballistic-separators/; FL; US.

Daehn, Katrin E .; Copper contamination in end-of-life steel recycling, developing a new strategy from million-tonnes to milligrams; thesis; St. Catherine's College; University of Cambridge; Jan. 2019; 258 pagess; UK.

United States International Searching Authority; International Search Report & Written Opinion for PCT/US2022/015665; May 23, 2022; 10 pages; Alexandria, VA; US.

Chinese Patent Office; Office Action issued for corresponding Chinese Application No. 201980043725.X on Apr. 28, 2022; 21 pages; Beijing, CN.

United States International Searching Authority; International Search Report & Written Opinion for PCT/US2022/020657; Jun. 16, 2022; 10 pages; Alexandria, VA.

Bishop, Christopher M.; Neural Networks for Pattern Recognition; 494 pages; Clarendon Press; 1995; Oxford, UK.

United States International Searching Authority; International Search Report & Written Opinion for PCT/US2022/016869; Jun. 29, 2022; 11 pages; Alexandria, VA.

Alipour et al.; Point-to-Point Stable Motion Planning of Wheeled Mobile Robots with Multiple Arms for Heavy Object Manipulation; 2011 IEEE International Conference on Robotics and Automation; Shanghai International Conference Center; May 9-13, 2011; Shanghai, CN.

Wikipedia; Articulated Robot; Retrieved from: "https://en.wikipedia.org/w/index.php?title=Articulated_robot&oldid=1090219198"; May 28, 2022; US.

Wikipedia: Industrial robot: Retrieved from https://en.wikipedia.org/w/index.php?title=Industrial_robot&oldid=1095073173; 14 pages; Jun. 26, 2022; US.

Wikipedia: Robotic arm: Retrieved from https://en.wikipedia.org/w/index.php?title=Robotic_arm&oldid=1093448239; 4 pages; Jun. 16, 2022; US.

United States International Searching Authority; International Search Report & Written Opinion for PCT/US2022/060626; May 2, 2023; 12 pages; Alexandria, VA.

United States International Searching Authority; International Search Report & Written Opinion for PCT/US2022/051681; Mar. 20, 2023; 6 pages; Alexandria, VA.

United States International Searching Authority; International Search Report & Written Opinion for PCT/US2022/039622; Oct. 28, 2022; 12 pages; Alexandria, VA.

Zhou et al.; SSA-CNN: Semantic Self-Attention CNN for Pedestrian Detection; arXiv: 1902.09080v3 [cs. CF] Jun. 6, 2019. Retrieved on Oct. 10, 2022; Retrieved from <URL: https://arxivorg/pdf/1902.09080.pdf>.

Jones et al., "Safe Steering Wheel Airbag Removal Using Active Disassemly":, DS 30; Proceedings of Design 2002, the 7th International Design Converence, dubrovnik, Retrieved on Jul. 10, 2022, from <https://desigsociety.org/publiatio/29632/Safe+Steering+Wheel+Airbag+Removal+Using+Active+Dissembly>.

Zhang, et al.; Designing and verifying a disassembly line approach to cope with the upsurge of end-of-life vehicles in China:, Elsevier, Waste Management 2018, Retrieved on Jul. 10, 2022 from <https://isiarticles.com/budles/Article/pre/pdf/98926.pdf>.

United States International Searching Authority; International Search Report & Written Opinion for PCT/US2022/047614; Feb. 21, 2023; 8 pages; Alexandria, VA.

Japan Patent Office; Office Action issued Jan. 10, 2023 for Serial No. 2021-509947; 9 pages (with translation).

United States International Searching Authority; International Search Report & Written Opinion for PCT/US2022/035011; Oct. 27, 2022; 8 pages; Alexandria, VA.

United States International Searching Authority; International Search Report & Written Opinion for PCT/US2022/035013; Sep. 23, 2022; 7 pages; Alexandria, VA.

United States International Searching Authority; International Search Report & Written Opinion for PCT/US2022/030943; Sep. 28, 2022; 10 pages; Alexandria, VA.

Gao; Applying Improved Optical Recognition with Machine Learning on Sorting Cu Impurities in Steel Scrap; 1-12, Journal of Sustainable Metallurgy, Web, Dec. 7, 2020.

Taiwan Patent Office; Office Action for Serial No. 111112261; May 23, 2023; 9 pgs (w/translation); TW.

United States Patent and Trademark Office; International Search Report and Written Opinion for parent PCT/US2022/015665; May 23, 2022; 10 pages; Alexandria, VA; US.

United States Patent and Trademark Office; International Search Report and Written Opinion for parent PCT/US2022/015693; May 6, 2022; 9 pages; Alexandria, VA; US.

Rozenstein, et al; Development of a new approach based on midwave infrared spectroscopy for post-consumer black plastic waster sorting in the recycling industry; Waste Management 68 (2017); CA.

* cited by examiner

SORTING OF DARK COLORED AND BLACK PLASTICS

This application claims priority to U.S. Provisional Patent Application Ser. No. 63/146,892 and to U.S. Provisional Patent Application Ser. No. 63/173,301. This application is a continuation-in-part application of U.S. patent application Ser. No. 17/495,291, which is a continuation of U.S. patent application Ser. No. 17/380,928, which is a continuation-in-part application of U.S. patent application Ser. No. 17/227,245, which is a continuation-in-part application of U.S. patent application Ser. No. 16/939,011, which is a continuation application of U.S. patent application Ser. No. 16/375,675 (issued as U.S. Pat. No. 10,722,922), which is a continuation-in-part application of U.S. patent application Ser. No. 15/963,755 (issued as U.S. Pat. No. 10,710,119), which claims priority to U.S. Provisional Patent Application Ser. No. 62/490,219, and which is a continuation-in-part application of U.S. patent application Ser. No. 15/213,129 (issued as U.S. Pat. No. 10,207,296), which claims priority to U.S. Provisional Patent Application Ser. No. 62/193,332, which are all hereby incorporated by reference herein. This application is also a continuation-in-part application of U.S. patent application Ser. No. 17/491,415, which is a continuation-in-part application of U.S. patent application Ser. No. 16/852,514, which is a divisional application of U.S. patent application Ser. No. 16/358,374 (issued as U.S. Pat. No. 10,625,304), which is a continuation-in-part application of U.S. patent application Ser. No. 15/963,755 (issued as U.S. Pat. No. 10,710,119).

GOVERNMENT LICENSE RIGHTS

This disclosure was made with U.S. government support under Grant No. DE-AR0000422 awarded by the U.S. Department of Energy. The U.S. government may have certain rights in this disclosure.

TECHNOLOGY FIELD

The present disclosure relates in general to the sorting of plastics, and in particular, to the sorting of dark colored and black-colored plastics from municipal or industrial solid waste.

BACKGROUND INFORMATION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Recycling is the process of collecting and processing materials (e.g., from waste streams) that would otherwise be thrown away as trash, and turning them into new products, or at least enabling a more appropriate disposal. Recycling has benefits for communities and for the environment, since it reduces the amount of waste sent to landfills, conserves natural resources such as timber, water, and minerals, increases economic security by tapping a domestic source of materials, prevents pollution by reducing the need to collect new raw materials, and saves energy. After collection, recyclables may be sent to a material recovery facility ("MRF") to be sorted, cleaned, and processed into materials that can be used in manufacturing. As a result, high throughput automated sorting platforms that economically sort highly mixed waste streams would be beneficial throughout various industries. Thus, there is a need for cost-effective sorting platforms that can identify, analyze, and separate mixed industrial or municipal solid waste streams with high throughput to economically generate higher quality feedstocks (which may also include lower levels of trace contaminants) for subsequent processing. Typically, MRFs are either unable to discriminate between many materials, which limits the sorted materials to lower quality and lower value markets, or too slow, labor intensive, and inefficient, which limits the amount of material that can be economically recycled or recovered.

Municipal Solid Waste ("MSW") is a broad term for waste streams that cover household, commercial, and industrial sources. Within each of these categories, there are thousands of different materials and products. The EPA has reported that in 2017, 267.8 million tons of MSW were generated. 35.37 million tons, or 13.2% of the total weight of that MSW was composed of plastics. Of those 35.37 million tons of plastic, 2.96 million tons (8.4%) of plastic were recycled, 5.59 million tons (15.8%) were combusted with energy recovery, and 26.82 million tons (75.8%) were landfilled. Clearly there is a need for more recycling of plastics.

Plastic recycling is the reprocessing of plastic waste into new and useful products. Recycling is necessary because almost all plastic is non-biodegradable and thus builds-up in the environment. Presently, almost all recycling is performed by remelting and reforming used plastic into new items; so-called mechanical recycling. This can cause polymer degradation at a chemical level, and also requires that plastic waste be sorted by both color and polymer type before being reprocessed, which is complicated and expensive. Failures in this can lead to materials with inconsistent properties, which is unappealing to industry. In an alternative approach known as feedstock recycling, plastic waste is converted back into its starting chemicals, which can then be reprocessed back into fresh plastic. This offers the hope of greater recycling but suffers from higher energy and capital costs. Plastic waste can also be burnt in place of fossil fuels as part of energy recovery.

Currently, only some plastics are recyclable. When plastics go into recycling, they are generally sorted into different types of plastics. Recycling rates also vary between types of plastic. Several types are in common use, each having distinct chemical and physical properties. This leads to differences in the ease with which they can be sorted and reprocessed, which affects the value and market size for recovered materials. Plastic packaging and products that are made from a single material (e.g., polyethylene terephthalate ("PET"), high density polyethylene ("HDPE"), and polypropylene ("PP")) can be more easily recycled. Plastics that are sometimes or almost never recyclable include polyvinyl chloride ("PVC"), low density polyethylene ("LDPE"), linear low-density polyethylene ("LLDPE"), and polystyrene ("PS"). Additionally, plastic can only be recycled a limited number of times.

In modern single-stream MRFs and plastic reclaimers, the large volume of incoming material necessitates processing equipment able to move and sort material at high speed. At the same time, the highest value is obtained from the purest, least contaminated streams. To accomplish these somewhat contradictory goals, today's single stream MRFs and reclaimers employ automated equipment that sorts plastic packaging by near infrared ("NIR") signature, either in transmission or reflection. These sensors rely on the reflection of light from an external source and can only view the surface of the material. Furthermore, only the polymer information is captured from this sensor. For example, NIR spectroscopy can identify #1 type plastics that are clear and light blue PET and #2 HDPE, while rejecting #1 colored PET, #3 PVC, #4 LDPE, #5 PP, #6 PS, and #7 Other plastics such as multilayered polymers, composite polymers, acrylic, and nylon. Furthermore, NIR spectroscopy cannot accurately identify black or strongly colored (dark pigmented) plastics, as well as composite materials like plastic-coated paper and multilayered packaging (made of polymer multilayer films), which can give misleading readings. Most black plastic is pigmented using carbon. Black plastics are widely used in the automotive industry, electronics, food packages, plastic bags, etc. But as well as absorbing visible light, black plastics also absorb the near-infrared part of the spectrum, which has the unfortunate side-effect of making it invisible to NIR spectroscopy. The "stealthy" black plastic thus passes undetected into the "miscellaneous" bin at the end of the conveyor, which is burned for energy or dumped to a landfill.

In closed-loop, or primary, recycling, waste plastic is recycled back into new items of a similar quality and sort (e.g., turning drink bottles back into drink bottles). However, the continual mechanical recycling of plastic without reduction in quality is very challenging due to cumulative polymer degradation and risk of contaminant build-up. Although closed-loop recycling has been investigated for many polymers, to date the only industrial successes have been with PET bottle recycling.

In open-loop, or secondary, recycling (also called downcycling), the quality of the plastic is reduced each time it is recycled, so that the material cannot be indefinitely recycled and eventually becomes waste. The recycling of PET bottles into fleece or other fibers is a common example, and accounts for the majority of PET recycling. The reduction in polymer quality can be offset by mixing recycled plastic with virgin material or compatibilized plastics when making a new product.

Although thermoset polymers do not melt, technologies have been developed for their mechanical recycling. This usually involves breaking the material down to a crumb, which can then be mixed with some sort of binding agent to form a new composite material.

In feedstock, or tertiary, recycling (also called chemical recycling), polymers are reduced to their chemical building-blocks (monomers), which can then be polymerized back into fresh plastics. Thermal depolymerization and chemical depolymerization are two types of feedstock recycling.

Energy recovery, also called energy recycling or quaternary recycling, involves burning plastic waste in place of fossil fuels for energy production.

A process has been developed in which certain kinds of plastic can be used as a carbon source (in place of coke) in the recycling of scrap steel. Ground plastic may be used as a construction aggregate or filler material in certain applications.

Plastic waste may be simply burnt as refuse-derived fuel ("RDF") in a waste-to-energy process, or it may be first chemically converted to a synthetic fuel. In either approach, PVC must be excluded or compensated for by installing dichlorination technologies, as it generates large amounts of hydrogen chloride (HCl) when burnt, which can corrode equipment and cause undesirable chlorination of the fuel products.

Mixed plastic waste can be depolymerized to give a synthetic fuel. This has a higher heating value than the starting plastic and can be burnt more efficiently, although it remains less efficient than fossil fuels. Various conversion technologies have been investigated, of which pyrolysis is the most common. The use of catalysts in pyrolysis can give a better-defined product with a higher value. Compared to the widespread use of incineration, plastic-to-fuel technologies have historically struggled to be economically viable because of the costs of collecting and sorting the plastic and the relatively low value of the fuel produced.

DETAILED DESCRIPTION

Figure 1:
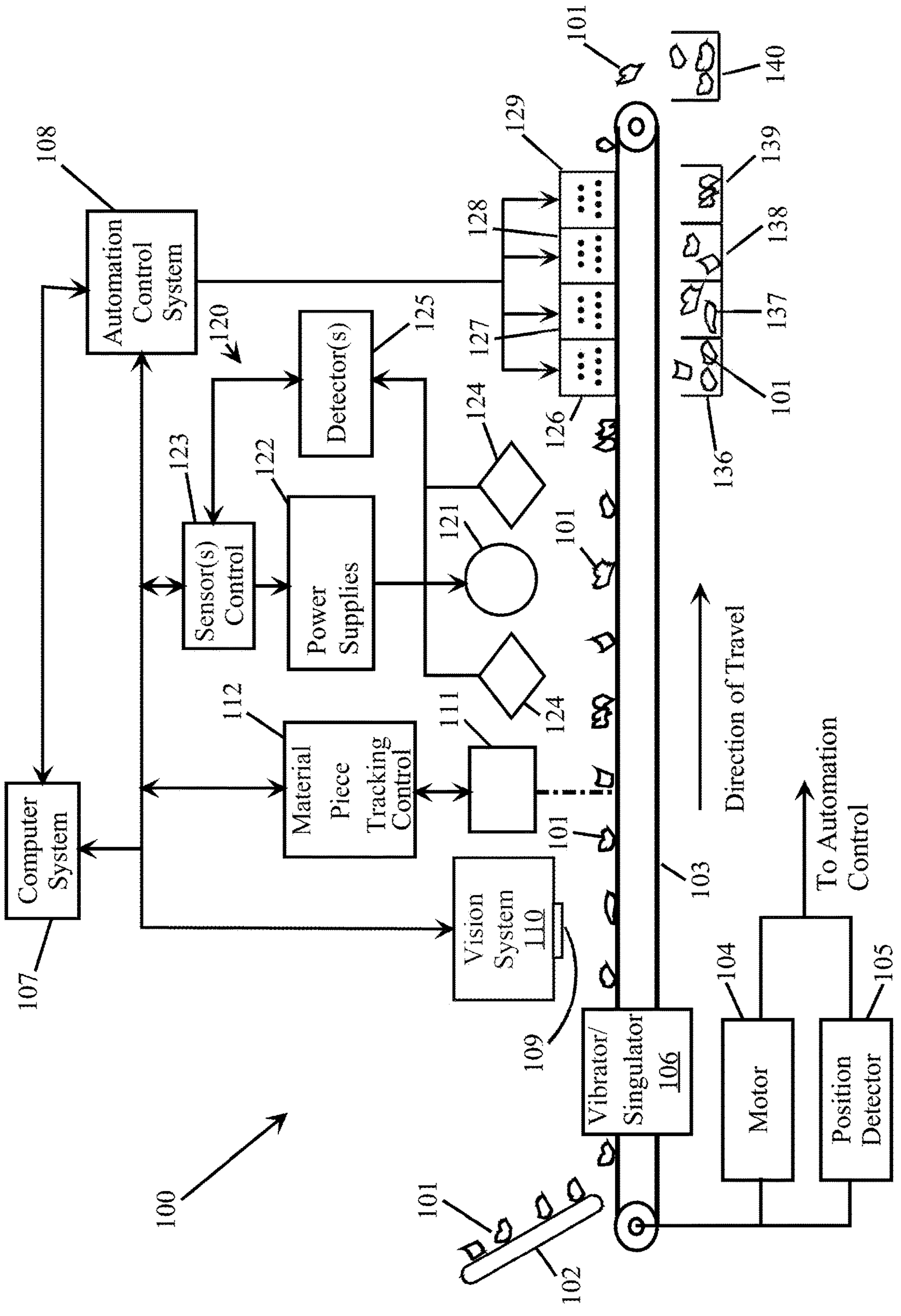
FIG. 1 illustrates a schematic of a sorting system configured in accordance with certain embodiments of the present disclosure.

Various detailed embodiments of the present disclosure are disclosed herein. However, it is to be understood that the disclosed embodiments are merely exemplary of the disclosure, which may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to employ various embodiments of the present disclosure.

As used herein, "materials" may include any item or object, including but not limited to, metals (ferrous and nonferrous), metal alloys, plastics (including, but not limited to any of the plastics disclosed herein, known in the industry, or newly created in the future), rubber, foam, glass (including, but not limited to borosilicate or soda lime glass, and various colored glass), ceramics, paper, cardboard, Teflon, PE, bundled wires, insulation covered wires, rare earth elements, leaves, wood, plants, parts of plants, textiles, bio-waste, packaging, electronic waste, batteries and accumulators, end-of-life vehicles, mining, construction, and demolition waste, crop wastes, forest residues, purpose-grown grasses, woody energy crops, microalgae, urban food waste, food waste, hazardous chemical and biomedical wastes, construction debris, farm wastes, biogenic items, non-biogenic items, objects with a specific carbon content, any other objects that may be found within municipal solid waste, and any other objects, items, or materials disclosed herein, including further types or classes of any of the foregoing that can be distinguished from each other, including but not limited to, by one or more sensor systems, including but not limited to, any of the sensor technologies disclosed herein.

A "material" may include any item or object composed of a chemical element, a compound or mixture of chemical elements, or a compound or mixture of a compound or mixture of chemical elements, wherein the complexity of a compound or mixture may range from being simple to complex. As used herein, "element" means a chemical element of the periodic table of elements, including elements that may be discovered after the filing date of this application. Within this disclosure, the terms "scrap," "scrap pieces," "materials," and "material pieces" may be used interchangeably.

As well known in the industry, a "polymer" is a substance or material composed of very large molecules, or macromolecules, composed of many repeating subunits. A polymer may be a natural polymer found in nature or a synthetic polymer.

"Multilayer polymer films" are composed of two or more different compositions and may possess a thickness of up to about $7.5^{-8} \times 10^{-4}$ m. The layers are at least partially contiguous and preferably, but optionally, coextensive.

As used herein, the terms "plastic," "plastic piece," and "piece of plastic material" (all of which may be used interchangeably) refer to any object that includes or is composed of a polymer composition of one or more polymers and/or multilayer polymer films.

As used herein, a "dark colored plastic" is any type of plastic material having dark colored pigmentation that cannot be distinguished from other lighter colored plastics by NIR spectroscopy.

As used herein, a "black-colored plastic" is any type of plastic material having a substantially black pigmentation.

As used herein, the term "chemical signature" refers to a unique pattern (e.g., fingerprint spectrum), as would be produced by one or more analytical instruments, indicating the presence of one or more specific elements or molecules (including polymers) in a sample. The elements or molecules may be organic and/or inorganic. Such analytical instruments include any of the sensor systems disclosed herein. In accordance with embodiments of the present disclosure, one or more sensor systems disclosed herein may be configured to produce a chemical signature of a material piece (e.g., a plastic piece).

As used here in, a "fraction" refers to any specified combination of organic and/or inorganic elements or molecules, polymer types, plastic types, polymer compositions, chemical signatures of plastics, physical characteristics of the plastic piece (e.g., color, transparency, strength, melting point, density, shape, size, manufacturing type, uniformity, reaction to stimuli, etc.), etc., including any and all of the various classifications and types of plastics disclosed herein. Non-limiting examples of fractions are one or more different types of plastic pieces that contain: LDPE plus a relatively high percentage of aluminum; LDPE and PP plus a relatively low percentage of iron; PP plus zinc; combinations of PE, PET, and HDPE; any type of red-colored LDPE plastic pieces; any combination of plastic pieces excluding PVC; dark colored plastic pieces and/or black-colored plastic pieces; plastic pieces that are at least partially composed of a dark colored and/or black-colored plastic material; combinations of #3-#7 type plastics that contain a specified combination of organic and inorganic molecules; combinations of one or more different types of multi-layer polymer films; combinations of specified plastics that do not contain a specified contaminant or additive; any types of plastics with a melting point greater than a specified threshold; any thermoset plastic of a plurality of specified types; specified plastics that do not contain chlorine; combinations of plastics having similar densities; combinations of plastics having similar polarities; plastic bottles without attached caps or vice versa.

"Catalytic pyrolysis" involves the degradation of the polymeric materials by heating them in the absence of oxygen and in the presence of a catalyst.

The term "predetermined" refers to something that has been established or decided in advance.

"Spectral imaging" is imaging that uses multiple bands across the electromagnetic spectrum. While an ordinary camera captures light across three wavelength bands in the visible spectrum, red, green, and blue (RGB), spectral imaging encompasses a wide variety of techniques that include but go beyond RGB. Spectral imaging may use the infrared (e.g., MWIR), visible, ultraviolet, and/or x-ray spectrums, or some combination of the above. Spectral data, or spectral image data, is a digital data representation of a spectral image. Spectral imaging may include the acquisition of spectral data in visible and non-visible bands simultaneously, illumination from outside the visible range, or the use of optical filters to capture a specific spectral range. It is also possible to capture hundreds of wavelength bands for each pixel in a spectral image.

As used herein, the term "image data packet" refers to a packet of digital data pertaining to a captured spectral image of an individual material piece.

As used herein, the terms "identify" and "classify," the terms "identification" and "classification," and any derivatives of the foregoing, may be utilized interchangeably. As used herein, to "classify" a piece of material is to determine (i.e., identify) a type or class of materials to which the piece of material belongs. For example, in accordance with certain embodiments of the present disclosure, a sensor system (as further described herein) may be configured to collect and analyze any type of information for classifying materials, which classifications can be utilized within a sorting system to selectively sort material pieces as a function of a set of one or more physical and/or chemical characteristics (e.g., which may be user-defined), including but not limited to, color, texture, hue, shape, brightness, weight, density, composition, size, uniformity, manufacturing type, chemical signature, predetermined fraction, radioactive signature, transmissivity to light, sound, or other signals, and reaction to stimuli such as various fields, including emitted and/or reflected electromagnetic radiation ("EM") of the material pieces. As used herein, "manufacturing type" refers to the type of manufacturing process by which the material piece was manufactured, such as a metal part having been formed by a wrought process, having been cast (including, but not limited to, expendable mold casting, permanent mold casting, and powder metallurgy), having been forged, a material removal process, etc.

The types or classes (i.e., classification) of materials may be user-definable and not limited to any known classification of materials. The granularity of the types or classes may range from very coarse to very fine. For example, the types or classes may include plastics, ceramics, glasses, metals, and other materials, where the granularity of such types or classes is relatively coarse; different metals and metal alloys such as, for example, zinc, copper, brass, chrome plate, and aluminum, where the granularity of such types or classes is finer; or between specific types or colors of plastic, where the granularity of such types or classes is relatively fine. Thus, the types or classes may be configured to distinguish between materials of significantly different compositions such as, for example, different types of plastics (e.g., between any of the #1 through #7 types of plastics), or to distinguish between materials of almost identical composition such as, for example, different subclasses of plastics that may fall within a particular plastic type (e.g., plastics that can be identified/distinguished by MWIR spectroscopy and those that cannot). It should be appreciated that the methods and systems discussed herein may be applied to accurately identify/classify pieces of material for which the composition is completely unknown before being classified.

Certain embodiments of the present disclosure advance plastic sorting capabilities by a fusion of multiple sensor technologies and a machine learning system. Limitations of sensor-based sorter technologies arise from the use of a single sensor, as each sensor is only able to detect a narrow range of signals. The most common sorter sensor types are eddy current, visible camera, x-ray transmission, near infrared, and x-ray fluorescence ("XRF"), which are summarized in the following table.

| Sensor Type | Associated Physics | Detected Signal |
|---|---|---|
| Eddy Current | Magnetic Field | Metals |
| Visible Camera | Visible Light Reflection | Different colored materials |
| X-Ray Transmission | X-Ray Intensity | Transmission, Density |
| Near Infrared | IR Spectrum | Polymer type |
| XRF | XRF Spectrum | Inorganic elemental composition |

Plastic pieces in MSW, however, can be composed of one or more organic polymers, one or more inorganic elements, and come in many different colors, shapes, and sizes. Examples of these plastics include potato chip bags, squeezable juice boxes, select drink containers, and electronics electromagnetic sensitive packaging. Certain embodiments of the present disclosure create novel fractions from this waste stream with a sensor-based technology that is able to achieve sorting of these different types of plastics into unique classifications that can account for their organic polymer composition and/or their inorganic elemental composition. A conversion chemist, for example, who is highly concerned with relative composition of polymers and inorganic elements would then be able to select one or more novel fractions that enable the creation of a particular product from the recycled plastics sorted into such fractions. As a result, sorting systems configured in accordance with embodiments of the present disclosure can produce fractions beyond what is possible with existing state-of-the-art sorting technologies.

As has been described herein, embodiments of the present disclosure may utilize a combination of a vision system 110 with a sensor system 120 utilizing one or more MWIR cameras in order to classify and/or sort one or more different types of dark colored and/or black-colored plastics from each other and/or other plastics or other materials. For example, dark colored and/or black-colored plastics of a certain shape (i.e., as a predetermined fraction) could be classified and sorted using such a combination.

Also as has been described herein, embodiments of the present disclosure may utilize a sensor system 120 utilizing one or more MWIR cameras in a manner by which the output (i.e., spectral imaging data) of the MWIR camera(s) is used to train a machine learning system to classify one or more different types of dark colored and/or black-colored plastics, whereby the trained machine learning system is then used to classify and/or sort such dark colored and/or black-colored plastics from a stream of materials, such as MSW.

Certain embodiments of the present disclosure may be configured to classify and/or sort a predetermined fraction from bales of #3-#7 type plastics to create new products (e.g., by recycling methods) and/or fuels. Exemplary end uses for such fractions may include, but are not limited to, gases (e.g., C1-C4), fuels (e.g., gasoline, diesel), and vacuum gas oils. However, sorting of #3-#7 type plastics based on their organic and inorganic elemental compositions has never been successfully accomplished.

Embodiments of the present disclosure may be configured to classify pieces of plastic materials according to various different predetermined fractions or combinations of characteristics or types, which are disclosed hereinafter and elsewhere within this disclosure.

According to their characteristics, there are three types of classifications regarding plastics according to their chemical structure, their polarity, and their applications.

According to their chemical structure and temperature behavior, plastics can be divided into thermoplastics, thermosets, and elastomers.

With regard to polarity, the presence of atoms of a different nature causes electrons to move towards the most electronegative atom in covalent bonds, thus resulting in a dipole. Polymers containing these extremely electronegative atoms, such as CI, O, N, F, etc., will be polar compounds, which has an effect on the properties of the material. If the polarity is increased, the mechanical resistance, hardness, rigidity, heat resistance, water and moisture absorption, and chemical resistance, as well as permeability to polar compounds such as water vapor and adhesivity and adherence to metals is also increased. At the same time, the increase in polarity reduces the thermal expansion, the electrical insulation capacity, the tendency to accumulate electrostatic charges and the permeability to polar molecules ($O_2$, $N_2$). In this way, it is possible to distinguish between different families such as polyolefins, polyesters, acetals, halogenated polymers, and others.

The third classification, according to their application, is applied to thermoplastic materials. There are four types of plastics within this third classification:

Standard plastics or commodities: plastics manufactured and used in large quantities due to their price and good characteristics in many ways. Some examples are polyethylene ("PE"), polypropylene ("PP"), polystyrene ("PS"), polyvinyl chloride ("PVC"), or the copolymer acrylonitrile butadiene styrene ("ABS").

Engineering plastics: used when good structural, transparency, self-lubrication, and thermal properties are needed. Some examples are polyamide ("PA"), polyacetal ("POM"), polycarbonate ("PC"), polyethylene terephthalate ("PET"), polyphenylene ether ("PPE"), and polybutylene terephthalate ("PBT").

Special plastics: they have a specific property to an extraordinary degree, such as polymethyl methacrylate ("PMMA"), which has high transparency and light stability, or polytetrafluoroethylene (Teflon), which has good resistance to temperature and chemical products.

High-performance plastics: mostly thermoplastic with high heat resistance. In other words, they have good mechanical resistance to high temperatures, particularly up to 150° C. Polyimide ("PI"), polysulfone ("PSU"), polyethersulfone ("PES"), polyarylsulfone ("PAS"), polyphenylene sulfide ("PPS"), and liquid crystal polymers ("LCP") are high-performance plastics.

Many plastic items bear symbols identifying the type of polymer from which they are made. These resin identification codes, often abbreviated RICs, are used internationally. There are seven codes in all, six for the most common commodity plastics types and one as a catch-all for everything else. These types are also be referred to herein as the polymer types #1-#7. Polymer type #1 refers to polyethylene terephthalate ("PET"), #2 refers to high-density polyethylene ("HDPE"), #3 refers to polyvinylchloride ("PVC"), #4 refers to low-density polyethylene ("LDPE"), #5 refers to polypropylene ("PP"), #6 refers to polystyrene ("PS"), and #7 refers to other polymers not in polymer types #1-#6 (e.g., acrylic, polycarbonate ("PC"), polyactic fibers, polylactide, nylon, fiberglass, ABS). The EU maintains a similar nine-code list, which also includes ABS and polyamides.

PET plastic is used to make many common household items such as beverage bottles, medicine jars, rope, clothing, and carpet fiber. HDPE plastic is often use to make containers for milk, motor oil, shampoos and conditioners, soap bottles, detergent, and bleaches. PVC is used for all kinds of pipes and tiles and most commonly found in plumbing pipes. LDPE products include cling-film, sandwich bags, squeezable bottles, and plastic grocery bags. PP is used to make lunchboxes, margarine containers, yogurt pots, syrup bottles, prescription bottles, and plastic bottle caps. Polystyrene items include disposable coffee cups, plastic food boxes, plastic cutlery, and packaging foam. Polycarbonate is used in baby bottles, compact discs, and medical storage containers. Therefore, in accordance with certain embodiments of the present disclosure, a vision system implemented with a machine learning system may be trained to discern and sort between these different types of plastics based on the type of product they have been made into.

Plastic pieces may be classified depending upon the types of additives they may contain. Additives are compounds blended into plastics to enhance performance and include stabilizers, fillers, and dyes. Clear plastics hold the highest value as they may yet be dyed, while black or strongly colored plastic is much less valuable, as their inclusion can give discolored products. Thus, plastic may need to be sorted by both polymer type and color to give a material suitable for recycling.

Plastics may also be classified and sorted based on density. Certain polymers have similar density ranges (for example, PP and PE, or PET, PS, and PVC). If a plastic piece contains a high percentage of fillers, this may affect its density.

Plastic waste can also be broadly divided into two categories: industrial scrap (sometimes referred to as postindustrial resin) and post-consumer waste.

Plastic pieces may also be classified/sorted due to how they may be recycled. During mechanical recycling, plastics may be reprocessed at anywhere between 150-320° C., depending on the polymer type, which may cause unwanted chemical reactions that result in polymer degradation. This can reduce the physical properties and overall quality of the plastic and can produce volatile, low-molecular weight compounds, which may impart undesirable taste or odor, as well as causing thermal discoloration. Therefore, embodiments of the present disclosure may be configured to classify and sort plastic pieces so that such unwanted chemical reactions are avoided. Additives present within the plastic can accelerate this degradation. For instance, oxo-biodegradable additives, intended to improve the biodegradability of plastic, can increase the degree of thermal degradation. Similarly, flame retardants can have unwanted effects. Therefore, embodiments of the present disclosure may be configured to classify and sort plastic pieces so that plastic pieces with certain ones of such additives are discarded.

The quality of the product may also strongly depend on how well the plastic was sorted. Many polymers are immiscible with one another when molten and will phase separate (like oil and water) during reprocessing. Products made from such blends contain many boundaries between the different polymer types, and cohesion across these boundaries is weak, leading to poor mechanical properties. Therefore, embodiments of the present disclosure may be configured to classify and sort plastic pieces so that certain immiscible plastic pieces are not sorted together into the same group.

The systems and methods described herein according to certain embodiments of the present disclosure receive a heterogeneous mixture of a plurality of material pieces (e.g., any combination of the various plastics disclosed herein), wherein at least one material piece within this heterogeneous mixture includes a composition of elements (e.g., resulting in a dark colored and/or black-colored plastic material) different from one or more other material pieces and/or at least one material piece within this heterogeneous mixture is distinguishable (e.g., visually discernible characteristics or features, different chemical signatures, etc.) from other material pieces, and the systems and methods are configured to identify/classify/sort this material piece into a group separate from such other material pieces. Embodiments of the present disclosure may be utilized to sort any types or classes of materials, or fractions as defined herein.

Embodiments of the present disclosure will be described herein as sorting material pieces into such separate groups by physically depositing (e.g., diverting or ejecting) the material pieces into separate receptacles or bins as a function of user-defined groupings (e.g., material type classifications or fractions). As an example, within certain embodiments of the present disclosure, material pieces may be sorted into separate bins in order to separate material pieces having physical characteristics that are distinguishable from the physical characteristics of other material pieces (e.g., visually discernible characteristics or features, different chemical signatures, etc.).

FIG. 1 illustrates an example of a system 100 configured in accordance with various embodiments of the present disclosure. A conveyor system 103 may be implemented to convey one or more streams of individual material pieces 101 through the system 100 so that each of the individual material pieces 101 can be tracked, classified, and sorted into predetermined desired groups. Such a conveyor system 103 may be implemented with one or more conveyor belts on which the material pieces 101 travel, typically at a predetermined constant speed. However, certain embodiments of the present disclosure may be implemented with other types of conveyor systems, including a system in which the material pieces free fall past the various components of the system 100 (or any other type of vertical sorter), or a vibrating conveyor system. Hereinafter, wherein applicable, the conveyor system 103 may also be referred to as the conveyor belt 103. In one or more embodiments, some or all of the acts of conveying, stimulating, detecting, classifying, and sorting may be performed automatically, i.e., without human intervention. For example, in the system 100, one or more sources of stimuli, one or more emissions detectors, a classification module, a sorting apparatus, and/or other system components may be configured to perform these and other operations automatically.

Furthermore, though FIG. 1 illustrates a single stream of material pieces 101 on a conveyor system 103, embodiments of the present disclosure may be implemented in which a plurality of such streams of material pieces are passing by the various components of the system 100 in parallel with each other. For example, as further described in U.S. Pat. No. 10,207,296, the material pieces may be distributed into two or more parallel singulated streams travelling on a single conveyor belt, or a set of parallel conveyor belts. As such, certain embodiments of the present disclosure are capable of simultaneously tracking, classifying, and sorting a plurality of such parallel travelling streams of material pieces. In accordance with certain embodiments of the present disclosure, incorporation or use of a singulator is not required. Instead, the conveyor system (e.g., the conveyor system 103) may simply convey a mass of material pieces, which have been deposited onto the conveyor system 103 in a random manner.

In accordance with certain embodiments of the present disclosure, some sort of suitable feeder mechanism (e.g., another conveyor system or hopper 102) may be utilized to feed the material pieces 101 onto the conveyor system 103, whereby the conveyor system 103 conveys the material pieces 101 past various components within the system 100. After the material pieces 101 are received by the conveyor system 103, an optional tumbler/vibrator/singulator 106 may be utilized to separate the individual material pieces from a collection of material pieces. Within certain embodiments of the present disclosure, the conveyor system 103 is operated to travel at a predetermined speed by a conveyor system motor 104. This predetermined speed may be programmable and/or adjustable by the operator in any well-known manner. Monitoring of the predetermined speed of the conveyor system 103 may alternatively be performed with a position detector 105. Within certain embodiments of the present disclosure, control of the conveyor system motor 104 and/or the position detector 105 may be performed by an automation control system 108. Such an automation control system 108 may be operated under the control of a computer system 107 and/or the functions for performing the automation control may be implemented in software within the computer system 107.

The conveyor system 103 may be a conventional endless belt conveyor employing a conventional drive motor 104 suitable to move the belt conveyor at the predetermined speeds. The position detector 105, which may be a conventional encoder, may be operatively coupled to the conveyor system 103 and the automation control system 108 to provide information corresponding to the movement (e.g., speed) of the conveyor belt. Thus, as will be further described herein, through the utilization of the controls to the conveyor system drive motor 104 and/or the automation control system 108 (and alternatively including the position detector 105), as each of the material pieces 101 travelling on the conveyor system 103 are identified, they can be tracked by location and time (relative to the various components of the system 100) so that various components of the system 100 can be activated/deactivated as each material piece 101 passes within their vicinity. As a result, the automation control system 108 is able to track the location of each of the material pieces 101 while they travel along the conveyor system 103.

Referring again to FIG. 1, certain embodiments of the present disclosure may utilize a vision, or optical recognition, system 110 and/or a material piece tracking device 111 as a means to track each of the material pieces 101 as they travel on the conveyor system 103. The vision system 110 may utilize one or more still or live action cameras 109 to note the position (i.e., location and timing) of each of the material pieces 101 on the moving conveyor system 103. The vision system 110 may be further, or alternatively, configured to perform certain types of identification (e.g., classification) of all or a portion of the material pieces 101, as will be further described herein. For example, such a vision system 110 may be utilized to capture or acquire information about each of the material pieces 101. For example, the vision system 110 may be configured (e.g., with a machine learning system) to capture or collect any type of information from the material pieces that can be utilized within the system 100 to classify and/or selectively sort the material pieces 101 as a function of a set of one or more characteristics (e.g., physical and/or chemical and/or radioactive, etc.) as described herein. In accordance with certain embodiments of the present disclosure, the vision system 110 may be configured to capture visual images of each of the material pieces 101 (including one-dimensional, two-dimensional, three-dimensional, or holographic imaging), for example, by using an optical sensor as utilized in typical digital cameras and video equipment. Such visual images captured by the optical sensor are then stored in a memory device as image data (e.g., formatted as image data packets). In accordance with certain embodiments of the present disclosure, such image data may represent images captured within optical wavelengths of light (i.e., the wavelengths of light that are observable by the typical human eye). However, alternative embodiments of the present disclosure may utilize a vision system that is configured to capture an image of a material made up of wavelengths of light outside of the visual wavelengths of the human eye (e.g., MWIR spectroscopy).

In accordance with certain embodiments of the present disclosure, the system 100 may be implemented with one or more sensor systems 120, which may be utilized solely or in combination with the vision system 110 to classify/identify material pieces 101. A sensor system 120 may be configured with any type of sensor technology for determining chemical signatures of plastic pieces and/or classifying plastic pieces for sorting, including sensor systems utilizing irradiated or reflected electromagnetic radiation (e.g., utilizing infrared ("IR"), Fourier Transform IR ("FTIR"), Forward-looking Infrared ("FLIR"), Very Near Infrared ("VNIR"), Near Infrared ("NIR"), Short Wavelength Infrared ("SWIR"), Long Wavelength Infrared ("LWIR"), Medium Wavelength Infrared ("MWIR" or "MIR"), X-Ray Transmission ("XRT"), Gamma Ray, Ultraviolet ("UV"), X-Ray Fluorescence ("XRF"), Laser Induced Breakdown Spectroscopy ("LIBS"), Raman Spectroscopy, Anti-stokes Raman Spectroscopy, Gamma Spectroscopy, Hyperspectral Spectroscopy (e.g., any range beyond visible wavelengths), Acoustic Spectroscopy, NMR Spectroscopy, Microwave Spectroscopy, Terahertz Spectroscopy, and including one-dimensional, two-dimensional, or three-dimensional imaging with any of the foregoing), or by any other type of sensor technology, including but not limited to, chemical or radioactive. Implementation of an exemplary XRF system (e.g., for use as a sensor system 120 herein) is further described in U.S. Pat. No. 10,207,296. XRF can be used within embodiments of the present disclosure to identify inorganic materials within a plastic piece (e.g., for inclusion within a chemical signature).

The following sensor systems may also be used within certain embodiments of the present disclosure for determining the chemical signatures of plastic pieces and/or classifying plastic pieces for sorting.

The previously disclosed various forms of infrared spectroscopy may be utilized to obtain a chemical signature specific of each plastic piece that provides information about the base polymer of any plastic material, as well as other components present in the material (mineral fillers, copolymers, polymer blends, etc.).

Differential Scanning Calorimetry ("DSC") is a thermal analysis technique that obtains the thermal transitions produced during the heating of the analyzed material specific for each material.

Thermogravimetric analysis ("TGA") is another thermal analysis technique resulting in quantitative information about the composition of a plastic material regarding polymer percentages, other organic components, mineral fillers, carbon black, etc.

Capillary and rotational rheometry can determine the rheological properties of polymeric materials by measuring their creep and deformation resistance.

Optical and scanning electron microscopy ("SEM") can provide information about the structure of the materials analyzed regarding the number and thickness of layers in multilayer materials (e.g., multilayer polymer films), dispersion size of pigment or filler particles in the polymeric matrix, coating defects, interphase morphology between components, etc.

Chromatography (e.g., LC-PDA, LC-MS, LC-LS, GC-MS, GC-FID, HS-GC) can quantify minor components of plastic materials, such as UV stabilizers, antioxidants, plasticizers, anti-slip agents, etc., as well as residual monomers, residual solvents from inks or adhesives, degradation substances, etc.

In accordance with embodiments of the present disclosure, the vision system 110 may be configured with one or more cameras configured to capture MWIR images (hyperspectral data in the MWIR region) of material pieces positioned in proximity to (e.g., above) the conveyor system so that MWIR images of the material pieces are captured as they pass by the vision system 110. Such camera(s) operate in the MWIR spectral range (2.7-5.3 μm), such as the Specim FX50 camera (commercially available from Specim, Spectral Imaging Ltd.), which is capable of detecting PS, PE, PP, ABS, and PVC black plastics, rubber, and specific additives in the MWIR region, and other dark colored plastics.

It should be noted that though FIG. 1 is illustrated with a combination of a vision system 110 and one or more sensor systems 120, embodiments of the present disclosure may be implemented with any combination of sensor systems utilizing any of the sensor technologies disclosed herein, or any other sensor technologies currently available or developed in the future. Though FIG. 1 is illustrated as including one or more sensor systems 120, implementation of such sensor system(s) is optional within certain embodiments of the present disclosure. Within certain embodiments of the present disclosure, a combination of both the vision system 110 and one or more sensor systems 120 may be used to classify the material pieces 101. Within certain embodiments of the present disclosure, any combination of one or more of the different sensor technologies disclosed herein may be used to classify the material pieces 101 without utilization of a vision system 110. Furthermore, embodiments of the present disclosure may include any combinations of one or more sensor systems and/or vision systems in which the outputs of such sensor/vision systems are processed within a machine learning system (as further disclosed herein) in order to classify/identify materials from a heterogeneous mixture of materials, which can then be sorted from each other.

In accordance with alternative embodiments of the present disclosure, a vision system 110 and/or sensor system(s) may be configured to identify which of the material pieces 101 are not of the kind to be sorted by the system 100 (e.g., plastic pieces containing a specific contaminant, additive, or undesirable physical feature (e.g., an attached container cap formed of a different type of plastic than the container)), and send a signal to reject such material pieces. In such a configuration, the identified material pieces 101 may be diverted/ejected utilizing one of the mechanisms as described hereinafter for physically diverting sorted material pieces into individual bins.

Within certain embodiments of the present disclosure, the material piece tracking device 111 and accompanying control system 112 may be utilized and configured to measure the sizes and/or shapes of each of the material pieces 101 as they pass within proximity of the material piece tracking device 111, along with the position (i.e., location and timing) of each of the material pieces 101 on the moving conveyor system 103. An exemplary operation of such a material piece tracking device 111 and control system 112 is further described in U.S. Pat. No. 10,207,296. Alternatively, as previously disclosed, the vision system 110 may be utilized to track the position (i.e., location and timing) of each of the material pieces 101 as they are transported by the conveyor system 103. As such, certain embodiments of the present disclosure may be implemented without a material piece tracking device (e.g., the material piece tracking device 111) to track the material pieces.

Within certain embodiments of the present disclosure that implement one or more sensor systems 120, the sensor system(s) 120 may be configured to assist the vision system 110 to identify the chemical composition, relative chemical compositions, and/or manufacturing types of each of the material pieces 101 as they pass within proximity of the sensor system(s) 120. The sensor system(s) 120 may include an energy emitting source 121, which may be powered by a power supply 122, for example, in order to stimulate a response from each of the material pieces 101.

In accordance with certain embodiments of the present disclosure that implement an XRF system as the sensor system 120, the source 121 may include an in-line x-ray fluorescence ("IL-XRF") tube, such as further described within U.S. Pat. No. 10,207,296. Such an IL-XRF tube may include a separate x-ray source each dedicated for one or more streams (e.g., singulated) of conveyed material pieces. In such a case, the one or more detectors 124 may be implemented as XRF detectors to detect fluoresced x-rays from material pieces 101 within each of the singulated streams. Examples of such XRF detectors are further described within U.S. Pat. No. 10,207,296.

Within certain embodiments of the present disclosure, as each material piece 101 passes within proximity to the emitting source 121, the sensor system 120 may emit an appropriate sensing signal towards the material piece 101. One or more detectors 124 may be positioned and configured to sense/detect one or more characteristics from the material piece 101 in a form appropriate for the type of utilized sensor technology. The one or more detectors 124 and the associated detector electronics 125 capture these received sensed characteristics to perform signal processing thereon and produce digitized information representing the sensed characteristics (e.g., spectral data), which is then analyzed in accordance with certain embodiments of the present disclosure, which may be used in order to assist the vision system 110 to classify each of the material pieces 101. This classification, which may be performed within the computer system 107, may then be utilized by the automation control system 108 to activate one of the N (N≥1)

sorting devices 126 . . . 129 of a sorting apparatus for sorting (e.g., diverting/ejecting) the material pieces 101 into one or more N (N≥1) sorting bins 136 . . . 139 according to the determined classifications. Four sorting devices 126 . . . 129 and four sorting bins 136 . . . 139 associated with the sorting devices are illustrated in FIG. 1 as merely a non-limiting example.

Existing sorters for plastics are designed to sort materials in a binary fashion, where air nozzles at the end of the conveyor eject an identified class of plastics into one of two bins. For example, if four classes of plastics needed to be separated, the entire stream would need to be conveyed through such a binary sorter four different times, which takes four times as long as trying to remove one single object in the stream. In accordance with certain embodiments of the present disclosure, the system 100 allows for multiple classifications of plastics to be sorted in one pass.

The sorting apparatus may include any well-known mechanisms for redirecting selected material pieces 101 towards a desired location, including, but not limited to, diverting the material pieces 101 from the conveyor belt system into a plurality of sorting bins. For example, a sorting apparatus may utilize air jets, with each of the air jets assigned to one or more of the classifications. When one of the air jets (e.g., 127) receives a signal from the automation control system 108, that air jet emits a stream of air that causes a material piece 101 to be diverted/ejected from the conveyor system 103 into a sorting bin (e.g., 137) corresponding to that air jet.

Other mechanisms may be used to divert/eject the material pieces, such as robotically removing the material pieces from the conveyor belt, pushing the material pieces from the conveyor belt (e.g., with paint brush type plungers), causing an opening (e.g., a trap door) in the conveyor system 103 from which a material piece may drop, or using air jets to divert the material pieces into separate bins as they fall from the edge of the conveyor belt. A pusher device, as that term is used herein, may refer to any form of device which may be activated to dynamically displace an object on or from a conveyor system/device, employing pneumatic, mechanical, or other means to do so, such as any appropriate type of mechanical pushing mechanism (e.g., an ACME screw drive), pneumatic pushing mechanism, or air jet pushing mechanism. Some embodiments may include multiple pusher devices located at different locations and/or with different diversion path orientations along the path of the conveyor system. In various different implementations, these sorting systems describe herein may determine which pusher device to activate (if any) depending on classifications of material pieces performed by the machine learning system. Moreover, the determination of which pusher device to activate may be based on the detected presence and/or characteristics of other objects that may also be within the diversion path of a pusher device concurrently with a target item. Furthermore, even for facilities where singulation along the conveyor system is not perfect, the disclosed sorting systems can recognize when multiple objects are not well singulated, and dynamically select from a plurality of pusher devices which should be activated based on which pusher device provides the best diversion path for potentially separating objects within close proximity. In some embodiments, objects identified as target objects may represent material that should be diverted off of the conveyor system. In other embodiments, objects identified as target objects represent material that should be allowed to remain on the conveyor system so that non-target materials are instead diverted.

In addition to the N sorting bins 136 . . . 139 into which material pieces 101 are diverted/ejected, the system 100 may also include a receptacle or bin 140 that receives material pieces 101 not diverted/ejected from the conveyor system 103 into any of the aforementioned sorting bins 136 . . . 139. For example, a material piece 101 may not be diverted/ejected from the conveyor system 103 into one of the N sorting bins 136 . . . 139 when the classification of the material piece 101 is not determined (or simply because the sorting devices failed to adequately divert/eject a piece). Thus, the bin 140 may serve as a default receptacle into which unclassified material pieces are dumped. Alternatively, the bin 140 may be used to receive one or more classifications of material pieces that have deliberately not been assigned to any of the N sorting bins 136 . . . 139. These such material pieces may then be further sorted in accordance with other characteristics and/or by another sorting system.

Depending upon the variety of classifications of material pieces desired, multiple classifications may be mapped to a single sorting device and associated sorting bin. In other words, there need not be a one-to-one correlation between classifications and sorting bins. For example, it may be desired by the user to sort certain classifications of materials into the same sorting bin (e.g., different plastic types that fall within a fraction). To accomplish this sort, when a material piece 101 is classified as falling into a predetermined grouping of classifications (e.g., a fraction), the same sorting device may be activated to sort these into the same sorting bin. Such combination sorting may be applied to produce any desired combination of sorted material pieces. The mapping of classifications may be programmed by the user (e.g., using the sorting algorithm (e.g., see FIG. 7) operated by the computer system 107) to produce such desired combinations. Additionally, the classifications of material pieces are user-definable, and not limited to any particular known classifications of material pieces (e.g., fractions as disclosed herein).

The conveyor system 103 may include a circular conveyor (not shown) so that unclassified material pieces are returned to the beginning of the system 100 and run through the system 100 again. Moreover, because the system 100 is able to specifically track each material piece 101 as it travels on the conveyor system 103, some sort of sorting device (e.g., the sorting device 129) may be implemented to direct/eject a material piece 101 that the system 100 has failed to classify after a predetermined number of cycles through the system 100 (or the material piece 101 is collected in bin 140).

Within certain embodiments of the present disclosure, the conveyor system 103 may be divided into multiple belts configured in series such as, for example, two belts, where a first belt conveys the material pieces past the vision system 110, and a second belt conveys certain sorted material pieces past an implemented sensor system 120 for a second sort. Moreover, such a second conveyor belt may be at a lower height than the first conveyor belt, such that the material pieces fall from the first belt onto the second belt.

Within certain embodiments of the present disclosure that implement a sensor system 120, the emitting source 121 may be located above the detection area (i.e., above the conveyor system 103); however, certain embodiments of the present disclosure may locate the emitting source 121 and/or detectors 124 in other positions that still produce acceptable sensed/detected physical characteristics.

The systems and methods described herein may be applied to classify and/or sort individual material pieces having any of a variety of sizes and shapes. Even though the systems and methods described herein are described primarily in relation to sorting individual material pieces, the systems and methods described herein are not limited thereto. Such systems and methods may be used to stimulate and/or detect emissions from a plurality of materials concurrently. For example, as opposed to a singulated stream of materials being conveyed along one or more conveyor belts in series, multiple singulated streams may be conveyed in parallel. Each stream may be a on a same belt or on different belts arranged in parallel. Further, pieces may be randomly distributed on (e.g., across and along) one or more conveyor belts. Accordingly, the systems and methods described herein may be used to stimulate, and/or detect emissions from, a plurality of material pieces at the same time. In other words, a plurality of material pieces may be treated as a single piece as opposed to each material piece being considered individually. Accordingly, the plurality of pieces of material may be classified and sorted (e.g., diverted/ejected from the conveyor system) together.

Although the systems and methods described herein are described primarily in relation to sorting material pieces, such systems and methods are not limited to that use. They may be used for other applications, for example, identifying elements (e.g., contaminants) within a material piece or determining the composition of a material piece.

As previously noted, certain embodiments of the present disclosure may implement one or more vision systems (e.g., vision system 110) in order to identify, track, and/or classify material pieces. In accordance with embodiments of the present disclosure, such a vision system(s) may operate alone to identify and/or classify and sort material pieces, or may operate in combination with one or more sensor systems (e.g., sensor system(s) 120) to identify and/or classify and sort material pieces. If a sorting system (e.g., system 100) is configured to operate solely with such a vision system(s) 110, then the sensor system(s) 120 may be omitted from the system 100 (or simply deactivated).

Regardless of the type(s) of sensed characteristics/information captured of the material pieces, the information (e.g., image data packets) may then be sent to a computer system (e.g., computer system 107) to be processed by a machine learning system in order to identify and/or classify each of the material pieces. Such a machine learning system may implement any well-known machine learning system, including one that implements a neural network (e.g., artificial neural network, deep neural network, convolutional neural network, recurrent neural network, autoencoders, reinforcement learning, etc.), fuzzy logic, artificial intelligence ("AI"), deep learning algorithms, deep structured learning hierarchical learning algorithms, support vector machine ("SVM") (e.g., linear SVM, nonlinear SVM, SVM regression, etc.), decision tree learning (e.g., classification and regression tree ("CART"), ensemble methods (e.g., ensemble learning, Random Forests, Bagging and Pasting, Patches and Subspaces, Boosting, Stacking, etc.), dimensionality reduction (e.g., Projection, Manifold Learning, Principal Components Analysis, etc.) and/or deep machine learning algorithms, such as those described in and publicly available at the deeplearning.net website (including all software, publications, and hyperlinks to available software referenced within this website), which is hereby incorporated by reference herein. Non-limiting examples of publicly available machine learning software and libraries that could be utilized within embodiments of the present disclosure include Python, OpenCV, Inception, Theano, Torch, PyTorch, Pylearn2, Numpy, Blocks, TensorFlow, MXNet, Caffe, Lasagne, Keras, Chainer, Matlab Deep Learning, CNTK, MatConvNet (a MATLAB toolbox implementing convolutional neural networks for computer vision applications), DeepLearnToolbox (a Matlab toolbox for Deep Learning (from Rasmus Berg Palm)), BigDL, Cuda-Convnet (a fast C++/CUDA implementation of convolutional (or more generally, feed-forward) neural networks), Deep Belief Networks, RNNLM, RNNLIB-RNNLIB, matrbm, deeplearning4j, Eblearn.lsh, deepmat, MShadow, Matplotlib, SciPy, CXXNET, Nengo-Nengo, Eblearn, cudamat, Gnumpy, 3-way factored RBM and mcRBM, mPoT (Python code using CUDAMat and Gnumpy to train models of natural images), ConvNet, Elektronn, OpenNN, NeuralDesigner, Theano Generalized Hebbian Learning, Apache Singa, Lightnet, and SimpleDNN.

In accordance with certain embodiments of the present disclosure, machine learning may be performed in two stages. For example, first, training occurs, which may be performed offline in that the system 100 is not being utilized to perform actual classifying/sorting of material pieces. The system 100 may be utilized to train the machine learning system in that homogenous sets (also referred to herein as control samples) of material pieces (i.e., having the same types or classes of materials (e.g., dark colored and/or black-colored plastics), or falling within the same predetermined fraction) are passed through the system 100 (e.g., by a conveyor system 103); and all such material pieces may not be sorted, but may be collected in a common bin (e.g., bin 140). Alternatively, the training may be performed at another location remote from the system 100, including using some other mechanism for collecting sensed information (characteristics) of control sets of material pieces. During this training stage, algorithms within the machine learning system extract features from the captured information (e.g., using image processing techniques well known in the art). Non-limiting examples of training algorithms include, but are not limited to, linear regression, gradient descent, feed forward, polynomial regression, learning curves, regularized learning models, and logistic regression. It is during this training stage that the algorithms within the machine learning system learn the relationships between materials and their features/characteristics (e.g., as captured by the vision system and/or sensor system(s) (e.g., utilizing MWIR spectroscopy to capture the features/characteristics)), creating a knowledge base for later classification of a heterogeneous mixture of material pieces received by the system 100, which may then be sorted by desired classifications. Such a knowledge base may include one or more libraries, wherein each library includes parameters (e.g., neural network parameters) for utilization by the machine learning system in classifying material pieces. For example, one particular library may include parameters configured by the training stage to recognize (classify) a particular type or class of material (e.g., dark colored and/or black-colored plastics), or one or more materials that fall with a predetermined fraction. In accordance with certain embodiments of the present disclosure, such libraries may be inputted into the machine learning system and then the user of the system 100 may be able to adjust certain ones of the parameters in order to adjust an operation of the system 100 (for example, adjusting the threshold effectiveness of how well the machine learning system recognizes a particular material piece (e.g., dark colored and/or black-colored plastics) from a heterogeneous mixture of materials).

Figure 2:
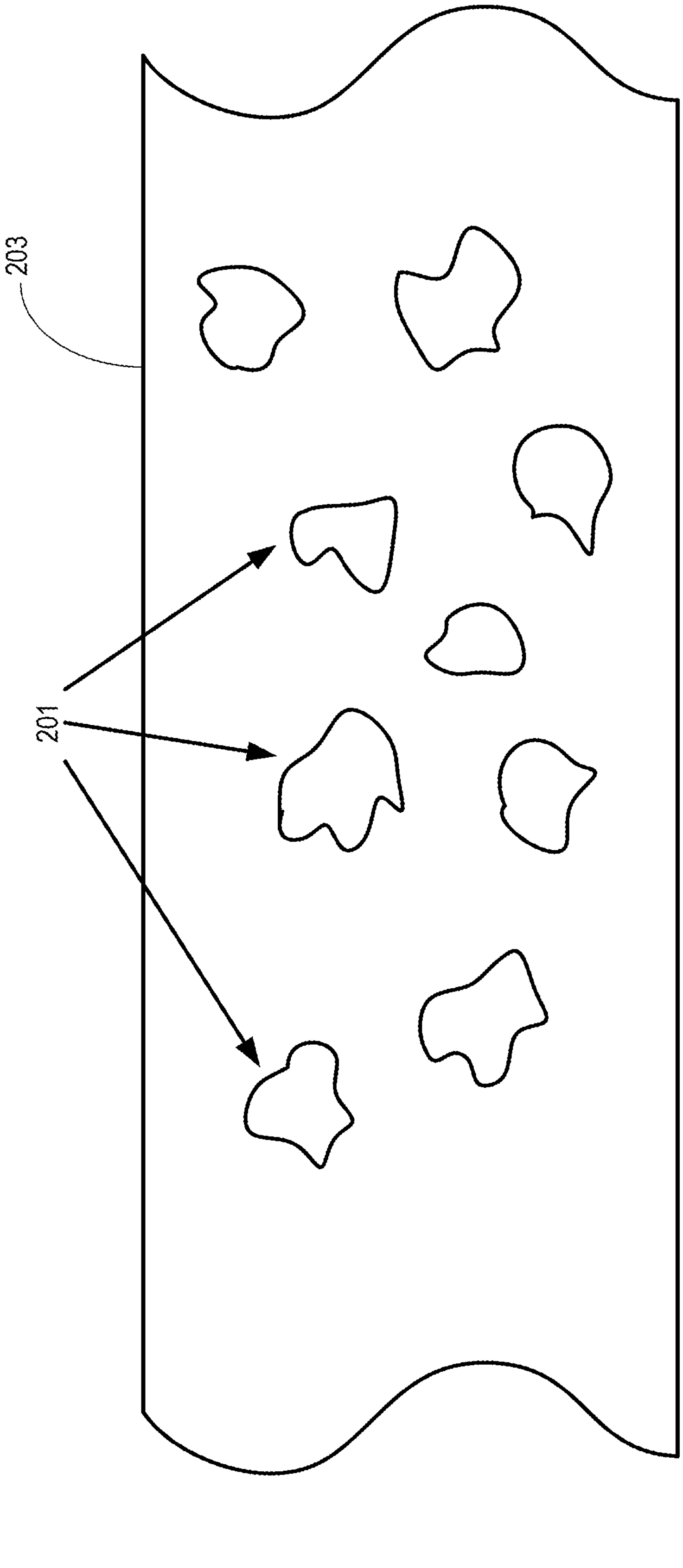
FIG. 2 illustrates an exemplary representation of a control set of material pieces used during a training stage in a machine learning system.

As depicted in FIG. 2, during a training stage, a plurality of material pieces 201 of one or more specific types, classifications, or fractions of material(s), which are the control samples, may be delivered past the vision system and/or one or more sensor system(s) (e.g., by a conveyor system 203) so that the algorithms within the machine learning system detect, extract, and learn what features represent such a type or class of material. For example, each of the material pieces 201 may be one or more plastic pieces in which at least some portion of the plastic piece is composed of a dark colored plastic material and/or a black-colored plastic material, which are passed through such a training stage so that the algorithms within the machine learning system "learn" (are trained) how to detect, recognize, and classify such plastic pieces accordingly. In the case of training a vision system (e.g., the vision system 110) implemented with one or more MWIR cameras, the machine learning system is trained to discern between material pieces that are dark colored and/or black-colored from those that are not. This creates a library of parameters particular to plastic materials that are at least composed of dark colored plastic material and/or a black-colored plastic material. Given captured sensed information as input data, the algorithms within the machine learning system may use N classifiers, each of which test for one of N different dark colored pigments and/or black-colored pigments. Note that the machine learning system may be "taught" (trained) to detect any type, class, or fraction of material, including any of the types, classes, or fractions materials found within MSW, or any other material disclosed herein.

After the algorithms have been established and the machine learning system has sufficiently learned (been trained) the differences (e.g., visually discernible differences) for the material classifications (e.g., within a user-defined level of statistical confidence), the libraries for the different material classifications are then implemented into a material classifying/sorting system (e.g., system 100) to be used for identifying and/or classifying material pieces (e.g., dark colored and/or black-colored plastics) from a heterogeneous mixture of material pieces (e.g., as contained within MSW), and then possibly sorting such classified material pieces if sorting is to be performed. For example, such a system 100 may be configured with a vision system 110 implemented with one or more MWIR cameras.

Techniques to construct, optimize, and utilize a machine learning system are known to those of ordinary skill in the art as found in relevant literature. Examples of such literature include the publications: Krizhevsky et al., "*ImageNet Classification with Deep Convolutional Networks*," Proceedings of the 25th International Conference on Neural Information Processing Systems, Dec. 3-6, 2012, Lake Tahoe, Nev., and LeCun et al., "*Gradient-Based Learning Applied to Document Recognition*," Proceedings of the IEEE, Institute of Electrical and Electronic Engineers (IEEE), November 1998, both of which are hereby incorporated by reference herein in their entirety.

In one example technique, data captured by a vision or sensor system with respect to a particular material piece may be processed as an array of data values (within a data processing system (e.g., the data processing system 3400 of FIG. 9) implementing (configured with) a machine learning system). For example, the data may be spectral data captured by a digital camera, other type of imaging sensor (e.g., a MWIR camera, such as a Specim FX50 or equivalent type of MWIR camera), or other type of sensor system with respect to a particular material piece and processed as an array of data values (e.g., image data packets). Each data value may be represented by a single number, or as a series of numbers representing values. These values may be multiplied by neuron weight parameters (e.g., with a neural network), and may possibly have a bias added. This may be fed into a neuron nonlinearity. The resulting number output by the neuron can be treated much as the values were, with this output multiplied by subsequent neuron weight values, a bias optionally added, and once again fed into a neuron nonlinearity. Each such iteration of the process is known as a "layer" of the neural network. The final outputs of the final layer may be interpreted as probabilities that a material (e.g., dark colored and/or black-colored plastics) is present or absent in the captured data pertaining to the material piece. Examples of such a process are described in detail in both of the previously noted "*ImageNet Classification with Deep Convolutional Networks*" and "*Gradient-Based Learning Applied to Document Recognition*" references.

In accordance with certain embodiments of the present disclosure in which a neural network is implemented, as a final layer (the "classification layer") the final set of neurons' output is trained to represent the likelihood a material piece (e.g., dark colored and/or black-colored plastics) is associated with the captured data. During operation, if the likelihood that a material piece is associated with the captured data is over a user-specified threshold, then it is determined that the material piece is indeed associated with the captured data. These techniques can be extended to determine not only the presence of a type of material associated with particular captured data, but also whether sub-regions of the particular captured data belong to one type of material or another type of material. This process is known as segmentation, and techniques to use neural networks exist in the literature, such as those known as "fully convolutional" neural networks, or networks that otherwise include a convolutional portion (i.e., are partially convolutional), if not fully convolutional. This allows for material location and size to be determined.

It should be understood that the present disclosure is not exclusively limited to machine learning techniques. Other common techniques for material classification/identification may also be used. For instance, a sensor system may utilize optical spectrometric techniques using multi- or hyper-spectral cameras to provide a signal that may indicate the presence or absence of a type, class, or fraction of material by examining the spectral emissions (i.e., spectral imaging) of the material. Spectral images of a material piece may also be used in a template-matching algorithm, wherein a database of spectral images is compared against an acquired spectral image to find the presence or absence of certain types of materials from that database. A histogram of the captured spectral image may also be compared against a database of histograms. Similarly, a bag of words model may be used with a feature extraction technique, such as scale-invariant feature transform ("SIFT"), to compare extracted features between a captured spectral image and those in a database.

Therefore, as disclosed herein, certain embodiments of the present disclosure provide for the identification/classification of one or more different types, classes, or fractions of materials in order to determine which material pieces should be diverted from a conveyor system in defined groups. In accordance with certain embodiments, machine learning techniques are utilized to train (i.e., configure) a neural network to identify a variety of one or more different types, classes, or fractions of materials (e.g., dark colored and/or black-colored plastics). Spectral images, or other types of sensed information (e.g., MWIR spectral data), are captured of materials (e.g., traveling on a conveyor system), and based on the identification/classification of such materials, the systems described herein can decide which material piece should be allowed to remain on the conveyor system, and which should be diverted/removed from the conveyor system (for example, either into a collection bin, or diverted onto another conveyor system).

In accordance with certain embodiments of the present disclosure, a machine learning system for an existing installation (e.g., the system 100) may be dynamically reconfigured to identify/classify characteristics of a new type, class, or fraction of materials by replacing a current set of neural network parameters with a new set of neural network parameters.

One point of mention here is that, in accordance with certain embodiments of the present disclosure, the detected/captured features/characteristics (e.g., spectral images) of the material pieces may not be necessarily simply particularly identifiable or discernible physical characteristics; they can be abstract formulations that can only be expressed mathematically, or not mathematically at all; nevertheless, the machine learning system may be configured to parse the spectral data to look for patterns that allow the control samples to be classified during the training stage. Furthermore, the machine learning system may take subsections of captured information (e.g., spectral images) of a material piece and attempt to find correlations between the pre-defined classifications.

In accordance with certain embodiments of the present disclosure, instead of utilizing a training stage whereby control samples of material pieces are passed by the vision system and/or sensor system(s), training of the machine learning system may be performed utilizing a labeling/annotation technique whereby as data/information of material pieces are captured by a vision/sensor system, a user inputs a label or annotation that identifies each material piece, which is then used to create the library for use by the machine learning system when classifying material pieces within a heterogenous mixture of material pieces.

Referring to FIGS. 3-6, certain embodiments of the present disclosure may be configured to combine or fuse multiple sensor technologies (e.g., any combination of visual ("VIS"), XRF, NIR, and MWIR) in a manner that uniquely identifies various types, classes, or fractions of plastics so that they can be sorted out by their organic and inorganic chemical composition. However, since these plastic pieces within MSW come in a lot of different sizes and shapes, the signals produced from these different sensors may possess large degrees of variances between them. Therefore, a combination of machine learning with the fusion of various sensor technologies improves the classification accuracy of these signals even in the presence of such large variances. Since implementing multiple different sensors in a system may increase the cost of the system, and also decrease the sorting speed, certain embodiments of the present disclosure may implement a system (e.g., the system 100) with a fewer number of sensor systems (and resultant lower capital and operating costs) to increase economic viability but yet be capable of sufficiently sorting materials.

Figure 4:
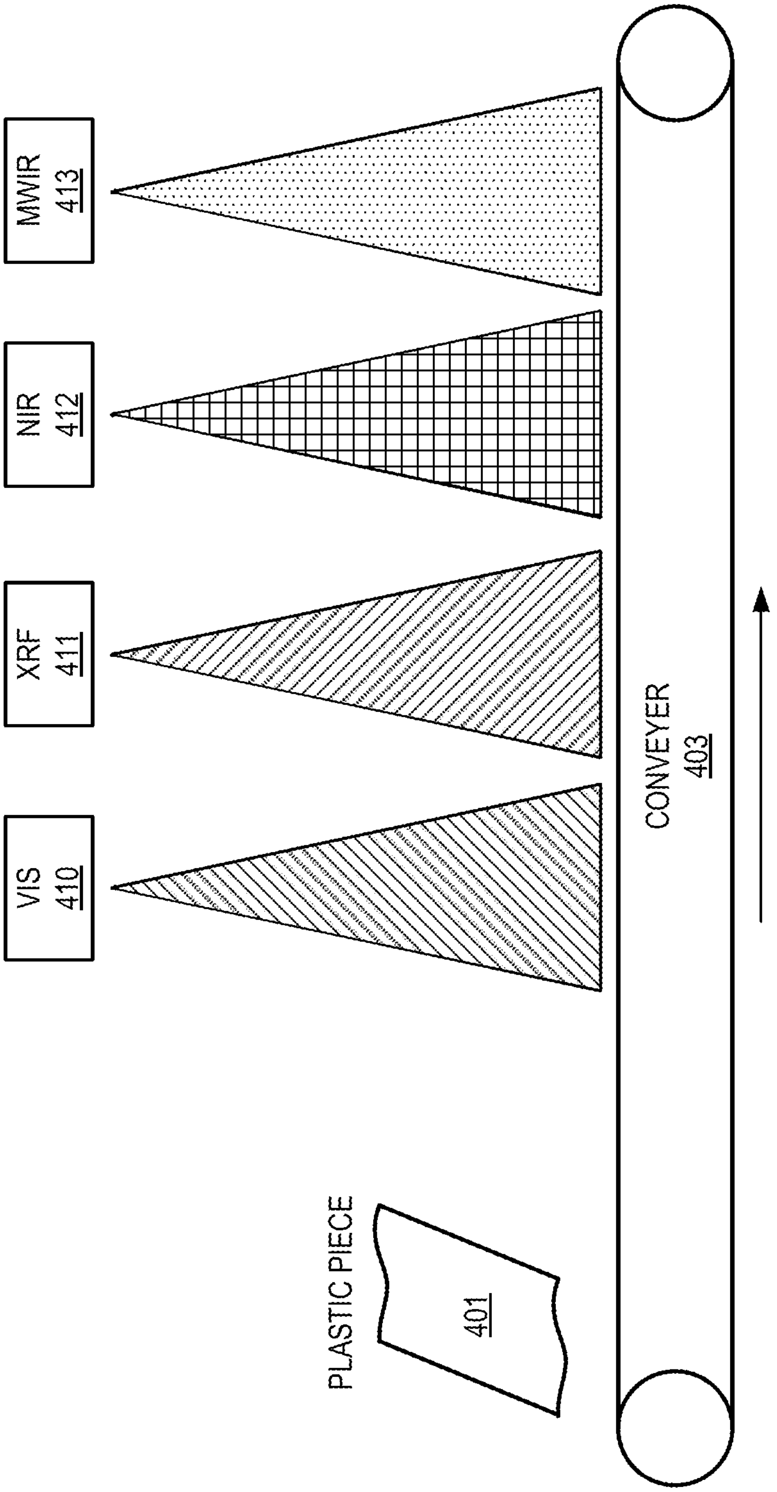
FIG. 4 illustrates a simplified schematic diagram configured in accordance with certain embodiments of the present disclosure.

FIG. 4 illustrates a simplified schematic diagram of a system (e.g., the system 100) whereby material pieces (e.g., plastic pieces) 401 are conveyed by a conveyor system 403 past the sensor system(s) that capture spectral data from each material piece 401. In this non-limiting example, the sensor system(s) are a camera 410 (e.g., the vision system 110) capturing visible image data of each material piece 401, an XRF system 411, an NIR system 412, and a MWIR system 413. Note, however, that any other sensor systems disclosed herein may be utilized in any combination.

Figure 3:
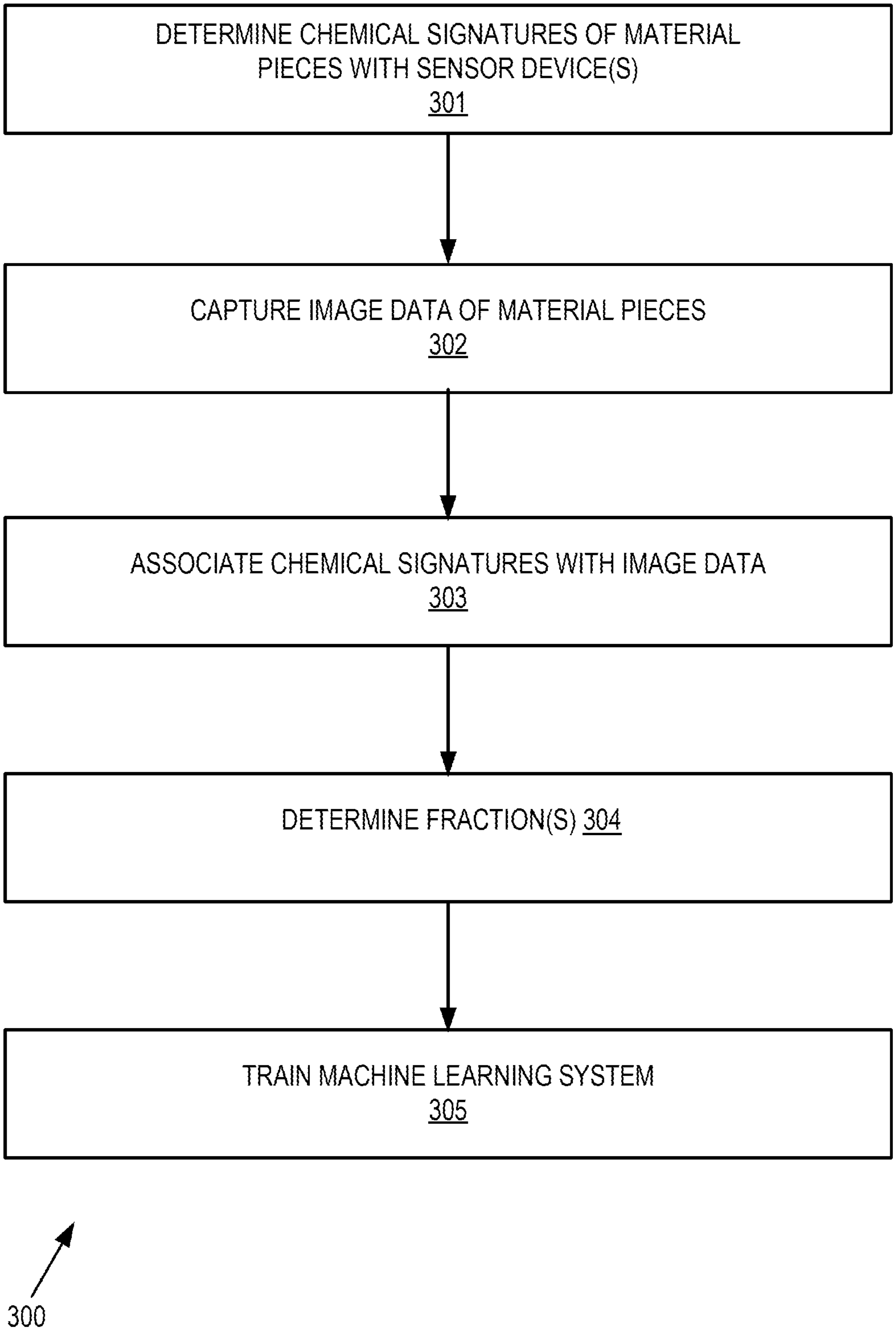
FIG. 3 illustrates a flowchart diagram configured in accordance with certain embodiments of the present disclosure.
Figure 5:
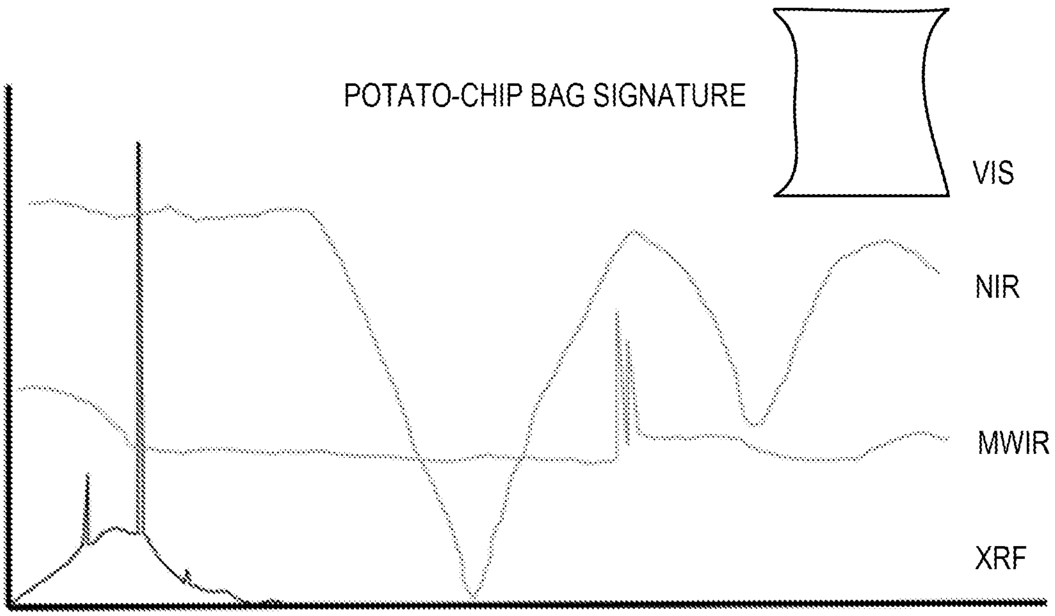
FIGS. 5 and 6 illustrate examples of chemical signatures.
Figure 6:
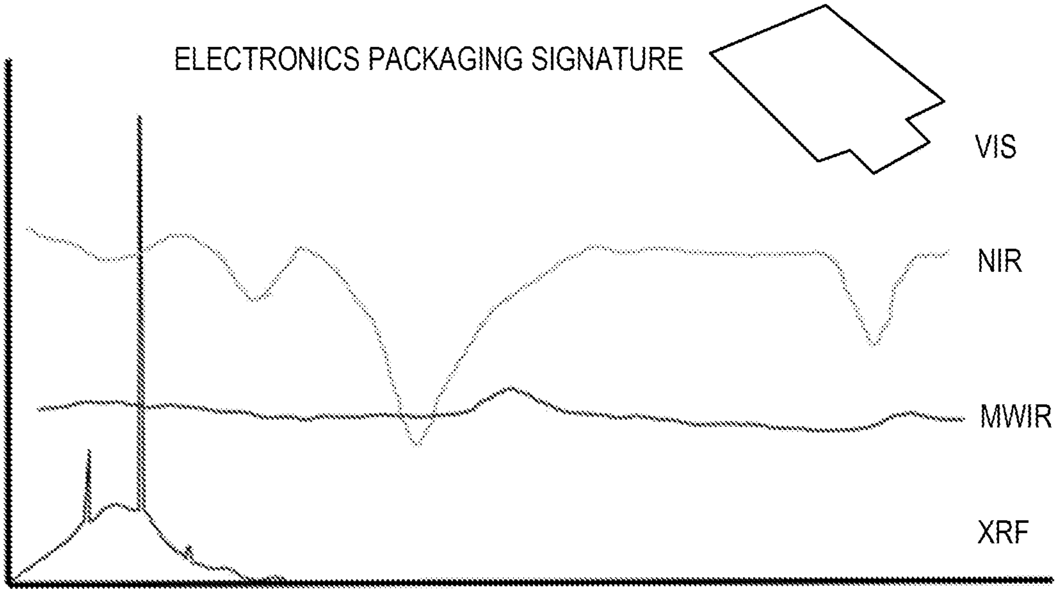

Referring to FIGS. 3 and 4, chemical signatures of materials are determined in the process block 301 with one or more sensor systems. The sensed/detected/captured signal from the sensor system(s) are combined (e.g., in a multidimensional data array) for each material piece to create a chemical signature. Recall that the XRF sensor system is capable of determining the presence of inorganic elements or molecules within the plastic pieces, while a combination of one or more other sensor systems, such as the NIR and MWIR, is capable of determining the presence of organic elements or molecules within the plastic pieces. In the process block 302, a visible image of each material piece is captured. In the process block 303, the captured visible image (i.e., its associated image data) of each material piece is associated with its determined chemical signature (i.e., the spectral image data). FIGS. 5 and 6 illustrate non-limiting exemplary representations of chemical signatures and associated image data for two different types of plastic materials—a potato chip bag and electronics packaging. As can be readily seen, different types or classes of plastic pieces will possess different (unique) chemical signatures, which are utilized within embodiments of the present disclosure to produce fractions and/or classifications (which may be user defined) for plastic waste. In accordance with certain embodiments of the present disclosure, control groups of specific types or classes of plastic pieces may be run through the system illustrated in FIG. 4 in order to train a machine learning system to associate a specific chemical signature with a specific type or class of plastic piece.

For example, with respect to the example illustrated in FIG. 5, images captured from multiple potato chip bags (which may include such bags of different physical conditions or orientations, or even bags associated with different brands of chips and/or manufacturers) may be processed through to train the machine learning system.

The process block 304 may involve separating the plastic pieces into one or more fractions. There are many ways to create these fractions. One method is to create a first tier based on a primary element and then secondary and even tertiary tiers based on minor elements. For example, fractions could be determined first by polymer type and then branching into inorganic elements such as aluminum and zinc. Other exemplary fractions could then be created for blends of polymers and then branching out into their inorganic elemental composition. There are also computational methods to perform this type of clustering to determine fractions such as principal component analysis, K-means clustering and unsupervised and semi-semi supervised learning. Fractions are further defined herein.

In the process block 305, after fractions have been determined, the plastic pieces pertaining to the fractions may be sorted (e.g., manually) to create a control group for each fraction. Because each fraction was measured with the sensor system(s), each control group contains chemical information about the pieces. A vision system (e.g., the vision system 110) may be used to train a machine learning system to identify those fractions. Using this method, the chemical data in the plastics is transferred to visual features, which the machine learning system can learn to classify. And when the system 100 is used to perform the classification based on the visual images, it is also separating the plastics by chemical composition. This method works when the two objects look different and have different chemical compositions. When the two objects look the same or very similar and have different chemical compositions, two or more sensor systems may be used to perform the classification (e.g., VIS plus XRF, etc.).

Since the determined fractions may compose any desired variety of specified organic and/or inorganic elements or molecules, the process 300 may be utilized to train a machine learning system implemented within a sorting system so that it is configured to sort a heterogeneous mixture of different plastic pieces to produce at least one fraction that contains plastic pieces of one or more different types or classes. For example, if the machine learning system has been trained to identify any plastic piece that contains a specified combination of organic and/or inorganic elements or molecules, then when the sorting is completed, that sorted out fraction may contain plastic pieces that are not all identical (i.e., a plurality of plastic chip bags that pertain to different brands of chips, since each plastic chip bag is composed of the organic and/or inorganic elements or molecules that are defined by the predetermined fraction).

Figure 7:
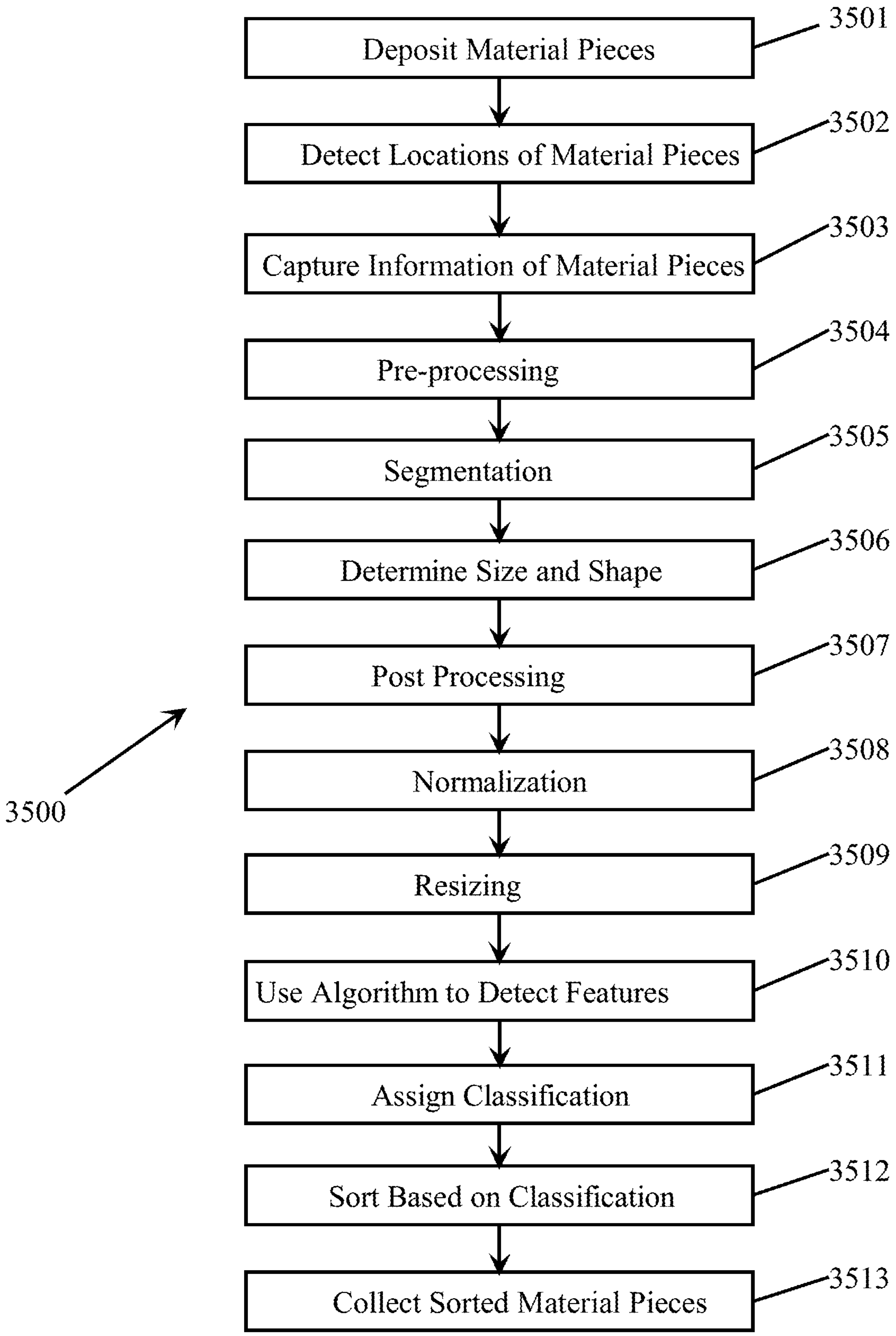
FIG. 7 illustrates a flowchart diagram configured in accordance with certain embodiments of the present disclosure.

FIG. 7 illustrates a flowchart diagram depicting exemplary embodiments of a process 3500 of classifying/sorting material pieces utilizing a vision system and/or one or more sensor systems in accordance with certain embodiments of the present disclosure. Note that various aspects of the process 3500 may be modified in order to account for the fact that MWIR spectroscopy is being utilized. The process 3500 may be performed to classify a heterogeneous mixture of plastic pieces into any combination of predetermined types, classes, and/or fractions (e.g., classify and/or sort dark colored and/or black-colored plastics from other plastics or waste). The process 3500 may be configured to operate within any of the embodiments of the present disclosure described herein, including the system 100 of FIG. 1. Operation of the process 3500 may be performed by hardware and/or software, including within a computer system (e.g., computer system 3400 of FIG. 9) controlling the system (e.g., the computer system 107, the vision system 110, and/or the sensor system(s) 120 of FIG. 1). In the process block 3501, the material pieces may be deposited onto a conveyor system. In the process block 3502, the location on the conveyor system of each material piece is detected for tracking of each material piece as it travels through the system 100. This may be performed by the vision system 110 (for example, by distinguishing a material piece from the underlying conveyor system material while in communication with a conveyor system position detector (e.g., the position detector 105)). Alternatively, a material tracking device 111 can be used to track the pieces. Or, any system that can create a light source (including, but not limited to, visual light, UV, and IR) and have a detector that can be used to locate the pieces. In the process block 3503, when a material piece has traveled in proximity to one or more of the vision system and/or the sensor system(s), sensed information/characteristics of the material piece is captured/acquired (e.g., by the vision system or a sensor system implemented with one or more MWIR cameras). In the process block 3504, a vision system (e.g., implemented within the computer system 107), such as previously disclosed, may perform pre-processing of the captured information (e.g., reflected MWIR from each material piece), which may be utilized to detect (extract) information of each of the material pieces (e.g., from the background (e.g., the conveyor belt); in other words, the pre-processing may be utilized to identify the difference between the material piece and the background). Well-known image processing techniques such as dilation, thresholding, and contouring may be utilized to identify the material piece as being distinct from the background. In the process block 3505, segmentation may be performed. For example, the captured information may include information pertaining to one or more material pieces. Additionally, a particular material piece may be located on a seam of the conveyor belt when its image is captured. Therefore, it may be desired in such instances to isolate the image of an individual material piece from the background of the image. In an exemplary technique for the process block 3505, a first step is to apply a high contrast of the image; in this fashion, background pixels are reduced to substantially all black pixels, and at least some of the pixels pertaining to the material piece are brightened to substantially all white pixels. The image pixels of the material piece that are white are then dilated to cover the entire size of the material piece. After this step, the location of the material piece is a high contrast image of all white pixels on a black background. Then, a contouring algorithm can be utilized to detect boundaries of the material piece. The boundary information is saved, and the boundary locations are then transferred to the original image. Segmentation is then performed on the original image on an area greater than the boundary that was earlier defined. In this fashion, the material piece is identified and separated from the background.

In the optional process block 3506, the material pieces may be conveyed along the conveyor system within proximity of a material piece tracking device and/or a sensor system in order to track each of the material pieces and/or determine a size and/or shape of the material pieces, which may be useful if an XRF system or some other spectroscopy sensor is also implemented within the sorting system. In the process block 3507, post processing may be performed. Post processing may involve resizing the captured information/data to prepare it for use in the machine learning system. This may also include modifying certain properties (e.g., enhancing image contrast, changing the image background, or applying filters) in a manner that will yield an enhancement to the capability of the machine learning system to classify the material pieces. In the process block 3509, the data may be resized. Data resizing may be desired under certain circumstances to match the data input requirements for certain machine learning systems, such as neural networks. For example, neural networks may require much smaller image sizes (e.g., 225×255 pixels or 299×299 pixels) than the sizes of the images captured by typical digital cameras. Moreover, the smaller the input data size, the less processing time is needed to perform the classification. Thus, smaller data sizes can ultimately increase the throughput of the system 100 and increase its value.

In the process blocks 3510 and 3511, each material piece is identified/classified based on the sensed/detected features by the one or more MWIR cameras. For example, the process block 3510 may be configured with a neural network employing one or more machine learning algorithms, which compare the extracted features with those stored in a previously generated knowledge base (e.g., generated during a training stage), and assigns the classification with the highest match to each of the material pieces based on such a comparison. The algorithms of the machine learning system may process the captured information/data in a hierarchical manner by using automatically trained filters. The filter responses are then successfully combined in the next levels of the algorithms until a probability is obtained in the final step. In the process block 3511, these probabilities may be used for each of the N classifications to decide into which of the N sorting receptacles the respective material pieces should be sorted. For example, each of the N classifications may be assigned to one sorting receptacle, and the material piece under consideration is sorted into that receptacle that corresponds to the classification returning the highest probability larger than a predefined threshold. Within embodiments of the present disclosure, such predefined thresholds may be preset by the user. A particular material piece may be sorted into an outlier receptacle (e.g., sorting receptacle 140) if none of the probabilities is larger than the predetermined threshold.

Next, in the process block 3512, a sorting device corresponding to the classification, or classifications, of the material piece is activated. Between the time at which the image of the material piece was captured and the time at which the sorting device is activated, the material piece has moved from the proximity of the vision system and/or sensor system(s) to a location downstream on the conveyor system (e.g., at the rate of conveying of a conveyor system). In embodiments of the present disclosure, the activation of the sorting device is timed such that as the material piece passes the sorting device mapped to the classification of the material piece, the sorting device is activated, and the material piece is diverted/ejected from the conveyor system into its associated sorting receptacle. Within embodiments of the present disclosure, the activation of a sorting device may be timed by a respective position detector that detects when a material piece is passing before the sorting device and sends a signal to enable the activation of the sorting device. In the process block 3513, the sorting receptacle corresponding to the sorting device that was activated receives the diverted/ejected material piece.

Figure 8:
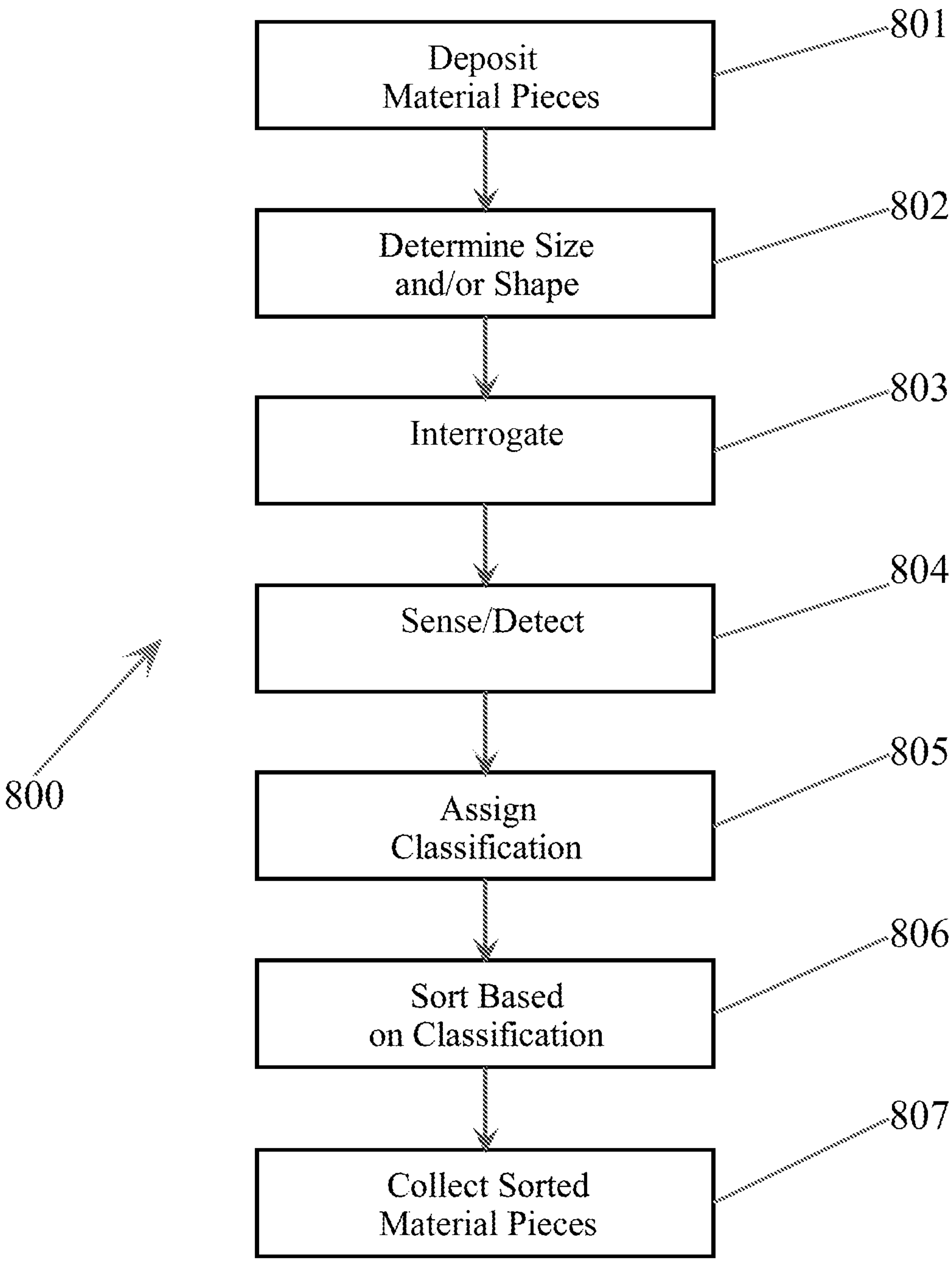
FIG. 8 illustrates a flowchart diagram configured in accordance with certain embodiments of the present disclosure.

FIG. 8 illustrates a flowchart diagram depicting exemplary embodiments of a process 800 of sorting material pieces in accordance with certain embodiments of the present disclosure. Note that various aspects of the process 800 may be modified in order to account for the fact that MWIR spectroscopy is being utilized. The process 800 may be configured to operate within any of the embodiments of the present disclosure described herein, including the system 100 of FIG. 1. The process 800 may be configured to operate in conjunction with the process 3500. For example, in accordance with certain embodiments of the present disclosure, the process blocks 803 and 804 may be incorporated in the process 3500 (e.g., operating in series or in parallel with the process blocks 3503-3510) in order to combine the efforts of a vision system 110 that is implemented in conjunction with a machine learning system with a sensor system (e.g., the sensor system 120) that is not implemented in conjunction with a machine learning system in order to classify and/or sort material pieces.

Operation of the process 800 may be performed by hardware and/or software, including within a computer system (e.g., computer system 3400 of FIG. 9) controlling the system (e.g., the computer system 107 of FIG. 1). In the process block 801, the material pieces may be deposited onto a conveyor system. Next, in the optional process block 802, the material pieces may be conveyed along the conveyor system within proximity of a material piece tracking device and/or an optical imaging system in order to track each material pieces and/or determine a size and/or shape of the material pieces. In the process block 803, when a material piece has traveled in proximity of the sensor system, the material piece may be interrogated, or stimulated, with EM energy (waves) (e.g., from one or more MWIR cameras) or some other type of stimulus appropriate for the particular type of sensor technology utilized by the sensor system. In the process block 804, physical characteristics of the material piece are sensed/detected and captured by the sensor system. In the process block 805, for at least some of the material pieces, the type of material is identified/classified based (at least in part) on the captured characteristics, which may be combined with the classification by the machine learning system in conjunction with the vision system 110.

Next, if sorting of the material pieces is to be performed, in the process block 806, a sorting device corresponding to the classification, or classifications, of the material piece is activated. Between the time at which the material piece was sensed and the time at which the sorting device is activated, the material piece has moved from the proximity of the sensor system to a location downstream on the conveyor system, at the rate of conveying of the conveyor system. In certain embodiments of the present disclosure, the activation of the sorting device is timed such that as the material piece passes the sorting device mapped to the classification of the material piece, the sorting device is activated, and the material piece is diverted/ejected from the conveyor system into its associated sorting receptacle. Within certain embodiments of the present disclosure, the activation of a sorting device may be timed by a respective position detector that detects when a material piece is passing before the sorting device and sends a signal to enable the activation of the sorting device. In the process block 807, the sorting receptacle corresponding to the sorting device that was activated receives the diverted/ejected material piece.

In accordance with certain embodiments of the present disclosure, a plurality of at least a portion of the system 100 may be linked together in succession in order to perform multiple iterations or layers of sorting. For example, when two or more systems 100 are linked in such a manner, the conveyor system may be implemented with a single conveyor belt, or multiple conveyor belts, conveying the material pieces past a first vision system (and, in accordance with certain embodiments, a sensor system) configured for sorting material pieces of a first set of a heterogeneous mixture of materials by a sorter (e.g., the first automation control system 108 and associated one or more sorting devices 126 . . . 129) into a first set of one or more receptacles (e.g., sorting bins 136 . . . 139), and then conveying the material pieces past a second vision system (and, in accordance with certain embodiments, another sensor system) configured for sorting material pieces of a second set of a heterogeneous mixture of materials by a second sorter into a second set of one or more sorting bins. A further discussion of such multistage sorting is in U.S. published patent application no. 2022/0016675, which is hereby incorporated by reference herein.

Such successions of systems 100 can contain any number of such systems linked together in such a manner. In accordance with certain embodiments of the present disclosure, each successive system may be configured to sort out a different classified or type of material than the previous system(s).

In accordance with various embodiments of the present disclosure, different types, classes, or fractions of materials may be classified by different types of sensors each for use with a machine learning system, and combined to classify material pieces in a stream of scrap or waste.

In accordance with various embodiments of the present disclosure, data (e.g., spectral data) from two or more sensors can be combined using a single or multiple machine learning systems to perform classifications of material pieces.

In accordance with various embodiments of the present disclosure, multiple sensor systems can be mounted onto a single conveyor system, with each sensor system utilizing a different machine learning system. In accordance with various embodiments of the present disclosure, multiple sensor systems can be mounted onto different conveyor systems, with each sensor system utilizing a different machine learning system.

Certain embodiments of the present disclosure may be configured to produce a mass of materials having a content of less than a predetermined weight or volume percentage of a certain element or material after sorting.

In accordance with various embodiments of the present disclosure, any combination of different types of sensor systems may be utilized to identify/classify and possibly sort materials as disclosed herein. For example, each imaging or spectroscopy sensor as disclosed herein may be used to generate data from information/characteristics sensed of material pieces in order to be processed by a machine learning system specific for that sensor system. Alternatively, any sensor system can be used without processing by a machine learning system, or with processing by a machine learning system, or a combination of both.

In accordance with various embodiments of the present disclosure, different types, classes, and/or fractions of materials may be classified by different types of sensor systems each for use with a machine learning system, and combined to classify material pieces in a waste stream.

Figure 9:
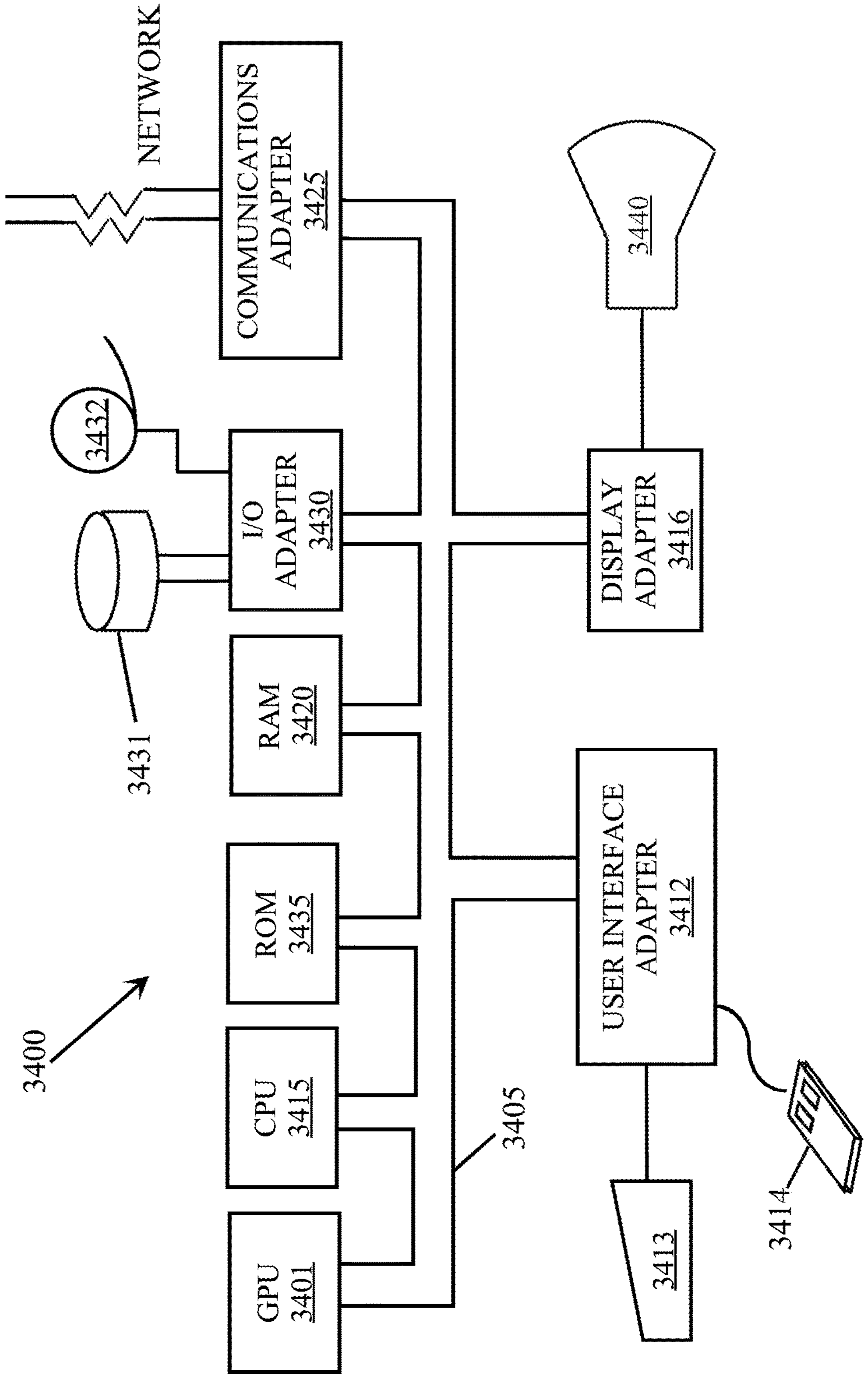
FIG. 9 illustrates a block diagram of a data processing system configured in accordance with certain embodiments of the present disclosure.

With reference now to FIG. 9, a block diagram illustrating a data processing ("computer") system 3400 is depicted in which aspects of embodiments of the disclosure may be implemented. (The terms "computer," "system," "computer system," and "data processing system" may be used interchangeably herein.) The computer system 107, the automation control system 108, aspects of the sensor system(s) 120, and/or the vision system 110 may be configured similarly as the computer system 3400. The computer system 3400 may employ a local bus 3405 (e.g., a peripheral component interconnect ("PCI") local bus architecture). Any suitable bus architecture may be utilized such as Accelerated Graphics Port ("AGP") and Industry Standard Architecture ("ISA"), among others. One or more processors 3415, volatile memory 3420, and non-volatile memory 3435 may be connected to the local bus 3405 (e.g., through a PCI Bridge (not shown)). An integrated memory controller and cache memory may be coupled to the one or more processors 3415. The one or more processors 3415 may include one or more central processor units and/or one or more graphics processor units 3401 and/or one or more tensor processing units. Additional connections to the local bus 3405 may be made through direct component interconnection or through add-in boards. In the depicted example, a communication (e.g., network (LAN)) adapter 3425, an I/O (e.g., small computer system interface ("SCSI") host bus) adapter 3430, and expansion bus interface (not shown) may be connected to the local bus 3405 by direct component connection. An audio adapter (not shown), a graphics adapter (not shown), and display adapter 3416 (coupled to a display 3440) may be connected to the local bus 3405 (e.g., by add-in boards inserted into expansion slots).

The user interface adapter 3412 may provide a connection for a keyboard 3413 and a mouse 3414, modem (not shown), and additional memory (not shown). The I/O adapter 3430 may provide a connection for a hard disk drive 3431, a tape drive 3432, and a CD-ROM drive (not shown).

An operating system may be run on the one or more processors 3415 and used to coordinate and provide control of various components within the computer system 3400. In FIG. 9, the operating system may be a commercially available operating system. An object-oriented programming system (e.g., Java, Python, etc.) may run in conjunction with the operating system and provide calls to the operating system from programs or programs (e.g., Java, Python, etc.) executing on the system 3400. Instructions for the operating system, the object-oriented operating system, and programs may be located on non-volatile memory 3435 storage devices, such as a hard disk drive 3431, and may be loaded into volatile memory 3420 for execution by the processor 3415.

Those of ordinary skill in the art will appreciate that the hardware in FIG. 9 may vary depending on the implementation. Other internal hardware or peripheral devices, such as flash ROM (or equivalent nonvolatile memory) or optical disk drives and the like, may be used in addition to or in place of the hardware depicted in FIG. 9. Also, any of the processes of the present disclosure may be applied to a multiprocessor computer system, or performed by a plurality of such systems 3400. For example, training of a machine learning system may be performed by a first computer system 3400, while operation of the system 100 for sorting may be performed by a second computer system 3400.

As another example, the computer system 3400 may be a stand-alone system configured to be bootable without relying on some type of network communication interface, whether or not the computer system 3400 includes some type of network communication interface. As a further example, the computer system 3400 may be an embedded controller, which is configured with ROM and/or flash ROM providing non-volatile memory storing operating system files or user-generated data.

The depicted example in FIG. 9 and above-described examples are not meant to imply architectural limitations. Further, a computer program form of aspects of the present disclosure may reside on any computer readable storage medium (i.e., floppy disk, compact disk, hard disk, tape, ROM, RAM, etc.) used by a computer system.

As has been described herein, embodiments of the present disclosure may be implemented to perform the various functions described for identifying, tracking, classifying, and/or sorting material pieces. Such functionalities may be implemented within hardware and/or software, such as within one or more data processing systems (e.g., the data processing system 3400 of FIG. 9), such as the previously noted computer system 107, the vision system 110, aspects of the sensor system(s) 120, and/or the automation control system 108. Nevertheless, the functionalities described herein are not to be limited for implementation into any particular hardware/software platform.

As will be appreciated by one skilled in the art, aspects of the present disclosure may be embodied as a system, process, method, and/or computer program product. Accordingly, various aspects of the present disclosure may take the form of an entirely hardware embodiment, an entirely software embodiment (including firmware, resident software, micro-code, etc.), or embodiments combining software and hardware aspects, which may generally be referred to herein as a "circuit," "circuitry," "module," or "system." Furthermore, aspects of the present disclosure may take the form of a computer program product embodied in one or more computer readable storage medium(s) having computer readable program code embodied thereon. (However, any combination of one or more computer readable medium(s) may be utilized. The computer readable medium may be a computer readable signal medium or a computer readable storage medium.)

A computer readable storage medium may be, for example, but not limited to, an electronic, magnetic, optical, electromagnetic, infrared, biologic, atomic, or semiconductor system, apparatus, controller, or device, or any suitable combination of the foregoing, wherein the computer readable storage medium is not a transitory signal per se. More specific examples (a non-exhaustive list) of the computer readable storage medium may include the following: an electrical connection having one or more wires, a portable computer diskette, a hard disk, a random access memory ("RAM") (e.g., RAM 3420 of FIG. 9), a read-only memory ("ROM") (e.g., ROM 3435 of FIG. 9), an erasable programmable read-only memory ("EPROM" or flash memory), an optical fiber, a portable compact disc read-only memory ("CD-ROM"), an optical storage device, a magnetic storage device (e.g., hard drive 3431 of FIG. 9), or any suitable combination of the foregoing. In the context of this document, a computer readable storage medium may be any tangible medium that can contain or store a program for use by or in connection with an instruction execution system, apparatus, controller, or device. Program code embodied on a computer readable signal medium may be transmitted using any appropriate medium, including but not limited to wireless, wire line, optical fiber cable, RF, etc., or any suitable combination of the foregoing.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, controller, or device.

The flowchart and block diagrams in the figures illustrate architecture, functionality, and operation of possible implementations of systems, methods, processes, and program products according to various embodiments of the present disclosure. In this regard, each block in the flowcharts or block diagrams may represent a module, segment, or portion of code, which includes one or more executable program instructions for implementing the specified logical function(s). It should also be noted that, in some implementations, the functions noted in the blocks may occur out of the order noted in the figures. For example, two blocks shown in succession may, in fact, be executed substantially concurrently, or the blocks may sometimes be executed in the reverse order, depending upon the functionality involved.

In the description herein, a flow-charted technique may be described in a series of sequential actions. The sequence of the actions, and the party performing the actions, may be freely changed without departing from the scope of the teachings. Actions may be added, deleted, or altered in several ways. Similarly, the actions may be re-ordered or looped. Further, although processes, methods, algorithms, or the like may be described in a sequential order, such processes, methods, algorithms, or any combination thereof may be operable to be performed in alternative orders. Further, some actions within a process, method, or algorithm may be performed simultaneously during at least a point in time (e.g., actions performed in parallel), can also be performed in whole, in part, or any combination thereof.

Modules implemented in software for execution by various types of processors (e.g., GPU 3401, CPU 3415) may, for instance, include one or more physical or logical blocks of computer instructions, which may, for instance, be organized as an object, procedure, or function. Nevertheless, the executables of an identified module need not be physically located together, but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices. Similarly, operational data (e.g., material classification libraries described herein) may be identified and illustrated herein within modules, and may be embodied in any suitable form and organized within any suitable type of data structure. The operational data may be collected as a single data set, or may be distributed over different locations including over different storage devices. The data may provide electronic signals on a system or network.

These program instructions may be provided to one or more processors and/or controller(s) of a general purpose computer, special purpose computer, or other programmable data processing apparatus (e.g., controller) to produce a machine, such that the instructions, which execute via the processor(s) (e.g., GPU 3401, CPU 3415) of the computer or other programmable data processing apparatus, create circuitry or means for implementing the functions/acts specified in the flowchart and/or block diagram block or blocks.

It will also be noted that each block of the block diagrams and/or flowchart illustrations, and combinations of blocks in the block diagrams and/or flowchart illustrations, can be implemented by special purpose hardware-based systems (e.g., which may include one or more graphics processing units (e.g., GPU 3401)) that perform the specified functions or acts, or combinations of special purpose hardware and computer instructions. For example, a module may be implemented as a hardware circuit including custom VLSI circuits or gate arrays, off-the-shelf semiconductors such as logic chips, transistors, controllers, or other discrete components. A module may also be implemented in programmable hardware devices such as field programmable gate arrays, programmable array logic, programmable logic devices, or the like.

Computer program code, i.e., instructions, for carrying out operations for aspects of the present disclosure may be written in any combination of one or more programming languages, including an object-oriented programming language such as Java, Smalltalk, Python, C++, or the like, conventional procedural programming languages, such as the "C" programming language or similar programming languages, or any of the machine learning software disclosed herein. The program code may execute entirely on the user's computer system, partly on the user's computer system, as a stand-alone software package, partly on the user's computer system (e.g., the computer system utilized for sorting) and partly on a remote computer system (e.g., the computer system utilized to train the sensor system), or entirely on the remote computer system or server. In the latter scenario, the remote computer system may be connected to the user's computer system through any type of network, including a local area network ("LAN") or a wide area network ("WAN"), or the connection may be made to an external computer system (for example, through the Internet using an Internet Service Provider).

These program instructions may also be stored in a computer readable storage medium that can direct a computer system, other programmable data processing apparatus, controller, or other devices to function in a particular manner, such that the instructions stored in the computer readable medium produce an article of manufacture including instructions which implement the function/act specified in the flowchart and/or block diagram block or blocks.

The program instructions may also be loaded onto a computer, other programmable data processing apparatus, controller, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

One or more databases may be included in a host for storing and providing access to data for the various implementations. One skilled in the art will also appreciate that, for security reasons, any databases, systems, or components of the present disclosure may include any combination of databases or components at a single location or at multiple locations, wherein each database or system may include any of various suitable security features, such as firewalls, access codes, encryption, de-encryption and the like. The database may be any type of database, such as relational, hierarchical, object-oriented, and/or the like. Common database products that may be used to implement the databases include DB2 by IBM, any of the database products available from Oracle Corporation, Microsoft Access by Microsoft Corporation, or any other database product. The database may be organized in any suitable manner, including as data tables or lookup tables.

Association of certain data (e.g., for each of the material pieces processed by a sorting system described herein) may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a key field in each of the manufacturer and retailer data tables. A key field partitions the database according to the high-level class of objects defined by the key field. For example, a certain class may be designated as a key field in both the first data table and the second data table, and the two data tables may then be merged on the basis of the class data in the key field. In these embodiments, the data corresponding to the key field in each of the merged data tables is preferably the same. However, data tables having similar, though not identical, data in the key fields may also be merged by using AGREP, for example.

Reference is made herein to "configuring" a device or a device "configured to" perform some function. It should be understood that this may include selecting predefined logic blocks and logically associating them, such that they provide particular logic functions, which includes monitoring or control functions. It may also include programming computer software-based logic of a retrofit control device, wiring discrete hardware components, or a combination of any or all of the foregoing.

In the descriptions herein, numerous specific details are provided, such as examples of programming, software modules, user selections, network transactions, database queries, database structures, hardware modules, hardware circuits, hardware chips, controllers, etc., to provide a thorough understanding of embodiments of the disclosure. One skilled in the relevant art will recognize, however, that the disclosure may be practiced without one or more of the specific details, or with other methods, components, materials, and so forth. In other instances, well-known structures, materials, or operations may be not shown or described in detail to avoid obscuring aspects of the disclosure.

Those of skill in the art should appreciate that the various settings and parameters (including the neural network parameters) of the components of the system 100 may be customized, optimized, and reconfigured over time based on the types of materials being classified and sorted, the desired classification and sorting results, the type of equipment being used, empirical results from previous classifications, data that becomes available, and other factors.

Reference throughout this specification to "an embodiment," "embodiments," or similar language means that a particular feature, structure, or characteristic described in connection with the embodiments is included in at least one embodiment of the present disclosure. Thus, appearances of the phrases "in one embodiment," "in an embodiment," "embodiments," "certain embodiments," "various embodiments," and similar language throughout this specification may, but do not necessarily, all refer to the same embodiment. Furthermore, the described features, structures, aspects, and/or characteristics of the disclosure may be combined in any suitable manner in one or more embodiments. Correspondingly, even if features may be initially claimed as acting in certain combinations, one or more features from a claimed combination can in some cases be excised from the combination, and the claimed combination can be directed to a sub-combination or variation of a sub-combination.

Benefits, advantages, and solutions to problems have been described herein with regard to specific embodiments. However, the benefits, advantages, solutions to problems, and any element(s) that may cause any benefit, advantage, or solution to occur or become more pronounced may be not to be construed as critical, required, or essential features or elements of any or all the claims. Further, no component described herein is required for the practice of the disclosure unless expressly described as essential or critical.

While this specification contains many specifics, these should not be construed as limitations on the scope of the disclosure or of what can be claimed, but rather as descriptions of features specific to particular implementations of the disclosure. Headings herein may be not intended to limit the disclosure, embodiments of the disclosure or other matter disclosed under the headings.

Herein, the term "or" may be intended to be inclusive, wherein "A or B" includes A or B and also includes both A and B. As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D.

The terminology used herein is for the purpose of describing particular embodiments only and is not intended to be limiting of the disclosure. As used herein, the singular forms "a," "an," and "the" may be intended to include the plural forms as well, unless the context clearly indicates otherwise.

The corresponding structures, materials, acts, and equivalents of all means or step plus function elements in the claims below may be intended to include any structure, material, or act for performing the function in combination with other claimed elements as specifically claimed.

As used herein, terms such as "controller," "processor," "memory," "neural network," "interface," "sorter," "device," "pushing mechanism," "pusher devices," "imaging sensor," "bin," "receptacle," "system," "circuitry" each refer to non-generic device elements that would be recognized and understood by those of skill in the art and are not used herein as nonce words or nonce terms for the purpose of invoking 35 U.S.C. 112(f).

As used herein with respect to an identified property or circumstance, "substantially" refers to a degree of deviation that is sufficiently small so as to not measurably detract from the identified property or circumstance. The exact degree of deviation allowable may in some cases depend on the specific context.

As used herein, a plurality of items, structural elements, compositional elements, exemplary fractions, and/or materials may be presented in a common list for convenience. However, these lists should be construed as though each member of the list is individually identified as a separate and unique member. Thus, no individual member of such list should be construed as a defacto equivalent of any other member of the same list solely based on their presentation in a common group without indications to the contrary.

Unless defined otherwise, all technical and scientific terms (such as acronyms used for polymers or chemical elements within the periodic table) used herein have the same meaning as commonly understood to one of ordinary skill in the art to which the presently disclosed subject matter belongs. All publications, patent applications, patents, and other references mentioned herein are incorporated by reference in their entirety, unless a particular passage is cited. In case of conflict, the present specification, including definitions, will control. In addition, the materials, methods, and examples (e.g., listed fractions, plastics) are illustrative only, and not intended to be limiting.

To the extent not described herein, many details regarding specific materials, processing acts, and circuits are conventional, and may be found in textbooks and other sources within the computing, electronics, and software arts.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in this specification and attached claims are approximations that can vary depending upon the desired properties sought to be obtained by the presently disclosed subject matter.

What is claimed is:

1. A system for handling a mixture of materials, the system comprising:

a medium wavelength infrared ("MWIR") camera configured to produce MWIR image data of the mixture of materials; and a data processing system comprising a machine learning system configured with a knowledge base to classify certain ones of the mixture of materials as containing dark colored plastic pieces by processing the MWIR image data of the mixture of materials through the machine learning system, wherein the knowledge base contains a previously generated library of parameters trained to recognize dark colored plastic pieces.

2. The system as recited in claim 1, wherein the dark colored plastic pieces are black-colored plastic pieces.

3. The system as recited in claim 2, further comprising:

a conveyor system configured to convey the mixture of materials past the MWIR camera; and a sorting apparatus configured to sort the classified certain ones of the mixture of materials from the mixture of materials as a function of the classifying of certain ones of the mixture of materials.

4. The system as recited in claim 2, wherein the previously generated library of parameters was trained with MWIR images captured from a homogenous set of samples of black-colored plastic pieces as they were conveyed past a MWIR camera.

5. The system as recited in claim 2, wherein the MWIR image data is produced as a result of MWIR spectroscopy imaging of the mixture of materials.

6. The system as recited in claim 1, wherein the previously generated library of parameters was trained with MWIR images captured from a homogenous set of samples of dark colored plastic pieces as they were conveyed past a MWIR camera.

7. The system as recited in claim 1, wherein the machine learning system comprises an artificial intelligence neural network, and wherein the parameters are neural network parameters.

8. The system as recited in claim 1, wherein the dark colored plastic pieces cannot be identified using NIR spectroscopy.

9. A method for handling a mixture of materials comprising dark colored plastic pieces, the method comprising:

producing MWIR image data of the mixture of materials;

processing the MWIR image data through a machine learning system configured with a knowledge base containing a previously generated library of MWIR spectroscopy characteristics pertaining to dark colored plastic pieces; and assigning with the machine learning system a classification to certain ones of the mixture of materials as containing dark colored plastic pieces as a function of the processing of the MWIR image data of the mixture of materials.

10. The method as recited in claim 9, further comprising:

conveying the mixture of materials past a MWIR camera configured to produce the MWIR image data; and sorting the certain ones of the mixture of materials from the mixture as a function of the classification.

11. The method as recited in claim 10, wherein the dark colored plastic pieces are black-colored plastic pieces.

12. The method as recited in claim 11, wherein the previously generated library of MWIR spectroscopy characteristics was captured by a MWIR camera configured to capture MWIR images of a homogenous set of samples of material pieces containing black-colored plastic pieces as they were conveyed past the MWIR camera.

13. The method as recited in claim 12, wherein the machine learning system comprises an artificial intelligence neural network, and wherein the parameters are neural network parameters.

14. The method as recited in claim 11, wherein the MWIR image data is produced as a result of MWIR spectroscopy imaging of the mixture of materials.

15. The method as recited in claim 11, wherein the black-colored plastic pieces cannot be identified using NIR spectroscopy.

16. The method as recited in claim 9, wherein the previously generated library of MWIR spectroscopy characteristics was captured by a MWIR camera configured to capture MWIR images of a homogenous set of samples of material pieces containing dark colored plastic pieces as they were conveyed past the MWIR camera.

* * * * *